US010981330B2

(12) United States Patent
Susnjara et al.

(10) Patent No.: US 10,981,330 B2
(45) Date of Patent: Apr. 20, 2021

(54) SYSTEMS AND METHODS FOR PRINTING COMPONENTS USING ADDITIVE MANUFACTURING

(71) Applicant: Thermwood Corporation, Dale, IN (US)

(72) Inventors: Kenneth J. Susnjara, Birdseye, IN (US); Scott G. Vaal, Jasper, IN (US); Nicolas C. Vote, Newburg, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 16/856,457

(22) Filed: Apr. 23, 2020

(65) Prior Publication Data

US 2020/0247048 A1  Aug. 6, 2020

Related U.S. Application Data

(63) Continuation of application No. 16/186,053, filed on Nov. 9, 2018, now Pat. No. 10,668,664.

(51) Int. Cl.
| | |
|---|---|
| *G05B 19/41* | (2006.01) |
| *B29C 64/227* | (2017.01) |
| *B29C 64/118* | (2017.01) |
| *B29C 64/209* | (2017.01) |
| *G05B 19/414* | (2006.01) |

(Continued)

(52) U.S. Cl.
CPC .......... *B29C 64/227* (2017.08); *B29C 64/118* (2017.08); *B29C 64/209* (2017.08); *G05B 19/4145* (2013.01); *B33Y 10/00* (2014.12); *B33Y 30/00* (2014.12)

(58) Field of Classification Search
CPC ... B29C 64/227; B29C 64/209; B29C 64/118; G05B 19/4145; B33Y 10/00; B33Y 30/00
See application file for complete search history.

(56) References Cited

U.S. PATENT DOCUMENTS

| | | |
|---|---|---|
| 6,180,049 B1 | 1/2001 | Jang et al. |
| 6,376,148 B1 | 4/2002 | Liu et al. |

(Continued)

OTHER PUBLICATIONS

M. Pérez; G. Medina-Sánchez; A. García-Collado; M. Gupta; and D. Carou, "Surface Quality Enhancement of Fused Deposition Modeling (FDM) Printed Samples Based on the Selection of Critical Printing Parameters", Jun. 2018, Materials 2018, 11, 1382; doi: 10.3390/ma11081382. (Year: 2018).*

(Continued)

*Primary Examiner* — Mohammad Ali
*Assistant Examiner* — Kelvin Booker
(74) *Attorney, Agent, or Firm* — Bookoff McAndrews, PLLC

(57) ABSTRACT

A method of forming a part using additive manufacturing may include receiving, at a computer numeric controlled (CNC) machine, a computer aided design (CAD) model of the part. The method may further include dividing the CAD model into plurality of sections. The method may further include slicing each of the plurality of sections into a plurality of layers. Each section may include a distinct set of print parameters. The method may further include depositing a flowable material onto a worktable according the set of print parameters for each section of the of the plurality of sections to manufacture the part.

20 Claims, 21 Drawing Sheets

(51) Int. Cl.
*B33Y 10/00* (2015.01)
*B33Y 30/00* (2015.01)

(56) References Cited

U.S. PATENT DOCUMENTS

| | | | |
|---|---|---|---|
| 6,401,001 B1 | 6/2002 | Jang et al. | |
| 7,003,864 B2 | 2/2006 | Dirscherl | |
| 7,731,816 B2 | 6/2010 | Oldani et al. | |
| 7,810,539 B2 | 10/2010 | Mischler et al. | |
| 8,151,854 B2 | 4/2012 | Oldani | |
| 8,534,338 B2 | 9/2013 | Oldani et al. | |
| 8,954,180 B2 | 2/2015 | Oldani | |
| 9,688,028 B2 | 6/2017 | Mark et al. | |
| 9,694,544 B2 | 7/2017 | Mark et al. | |
| 9,815,268 B2 | 11/2017 | Mark et al. | |
| 2002/0062909 A1 | 5/2002 | Jang et al. | |
| 2002/0093115 A1 | 7/2002 | Jang et al. | |
| 2002/0145213 A1 | 10/2002 | Liu et al. | |
| 2002/0149137 A1 | 10/2002 | Jang et al. | |
| 2007/0044899 A1 | 3/2007 | Tingley | |
| 2008/0006017 A1 | 1/2008 | Rindels | |
| 2010/0200168 A1 | 8/2010 | Oldani et al. | |
| 2013/0289593 A1* | 10/2013 | Hall | H01L 41/1876 606/169 |
| 2014/0163717 A1* | 6/2014 | Das | C30B 13/24 700/119 |
| 2014/0242539 A1 | 8/2014 | Fisker et al. | |
| 2015/0005919 A1 | 1/2015 | McGatha et al. | |
| 2015/0093283 A1 | 4/2015 | Miller et al. | |
| 2015/0096426 A1 | 4/2015 | Culver et al. | |
| 2015/0190754 A1 | 7/2015 | Harp | |
| 2016/0052208 A1* | 2/2016 | Debora | B29C 64/118 264/40.1 |
| 2016/0068793 A1 | 3/2016 | Maggiore | |
| 2016/0107379 A1 | 4/2016 | Mark et al. | |
| 2016/0144563 A1 | 5/2016 | Elliott | |
| 2016/0151861 A1 | 6/2016 | Soracco et al. | |
| 2016/0263822 A1 | 9/2016 | Boyd, IV | |
| 2016/0271875 A1* | 9/2016 | Brown, Jr. | B29C 64/153 |
| 2017/0014169 A1 | 1/2017 | Dean et al. | |
| 2017/0021455 A1 | 1/2017 | Dallarosa et al. | |
| 2017/0120535 A1 | 5/2017 | MacCurdy et al. | |
| 2017/0144242 A1* | 5/2017 | McQueen | B23K 9/042 |
| 2017/0144370 A1* | 5/2017 | Moore | B29C 64/141 |
| 2017/0197371 A1* | 7/2017 | Fetfatsidis | B29C 64/386 |
| 2017/0205806 A1 | 7/2017 | Chaphalkar et al. | |
| 2017/0216915 A1* | 8/2017 | Holcomb | B22F 3/24 |
| 2017/0217088 A1* | 8/2017 | Boyd, IV | B29C 64/106 |
| 2017/0259502 A1* | 9/2017 | Chapiro | B33Y 10/00 |
| 2017/0312821 A1 | 11/2017 | DeFelice et al. | |
| 2017/0333980 A1 | 11/2017 | Yang et al. | |
| 2018/0036800 A1 | 2/2018 | Torabi et al. | |
| 2018/0050502 A1 | 2/2018 | Oldani et al. | |
| 2018/0071949 A1 | 3/2018 | Giles | |
| 2018/0071989 A1 | 3/2018 | Zenou et al. | |
| 2018/0237325 A1 | 8/2018 | Li et al. | |
| 2018/0250744 A1 | 9/2018 | Symeonidis et al. | |
| 2018/0250747 A1 | 9/2018 | Davidson et al. | |
| 2018/0339456 A1 | 11/2018 | Czinger et al. | |
| 2018/0370114 A1* | 12/2018 | Hopkins | B29C 64/209 |
| 2018/0373227 A1 | 12/2018 | Sadusk et al. | |
| 2019/0001580 A1 | 1/2019 | Zenou et al. | |
| 2019/0054700 A1 | 2/2019 | Chandar et al. | |
| 2019/0299290 A1 | 10/2019 | Kuhns et al. | |
| 2019/0322044 A1 | 10/2019 | Susnjara et al. | |

OTHER PUBLICATIONS

T. Nancharaiah; D. Ranga Raju; and V. Ramachandra Raju, "An experimental investigation on surface quality and dimensional accuracy of FDM components", 2010, International Journal on Emerging Technologies 1(2): 106-111. (Year: 2010).*

M. B Mawale; A. M. Kuthe; and S. W. Dahake, "Additive layered manufacturing:State-of-the-art applications in product innovation", Concurrent Engineering: Research and Applications 2016, vol. 24(1) 94-102. (Year: 2016).*

Y. Jin; J. Du; Y. He; and G. Fu, "Modeling and process planning for curved layer fused deposition", 2017, Int J Adv Manuf Technol 91:273-285 DOI 10.1007/s00170-016-9743-5. (Year: 2017).*

N.H. Harun; M.S. Kasim; M.Z.Z. Abidin; R. Izannshah; H. Attan and H.N. Ganesan, "A Study on Surface Roughness During Fused Deposition Modelling: A Review", Aug. 16, 2017, Journal of Advanced Manufacturing Technology, iDEACON 2016, eISSN: 2289-8107. (Year: 2017).*

D.S. González and A.G. Álvarez, Additive Manufacturing Feasibility Study & Technology Demonstration EDA AM State of the Art & Strategic Report, Jan. 2018, European Defense Agency. (Year: 2018).*

International Search Report and Written Opinion for International Application No. PCT/US2019/055585, dated Jan. 27, 2020, (15 pages).

Didier Klein, "CURA 2.6: Plusieurs densités dans une même impression", YouTube, Jun. 27, 2017, (3 pages). URL:https://www.youtube.com/watch/?v=PBZ9fhBii8w.

3D Printing Nerd, "Dual Extrusion 3D Printing with Simplify3D and CURA on the BCN Sigma R17 and Ultimaker 3", Apr. 25, 2017, (3 pages). URL: https://www.youtube.com/watch?v=RE-ZgJ5vzXk.

MatterHackers, "How to Make a Dual Extrusion 3D Print // 3D Printing Tutorial", Feb. 13, 2018, (1 page). URL:https://www.youtube.com/watch?v=wC0JLfr--08.

3D Universe, "Ultimaker Cura: Adaptive Layers (3D Universe)", Apr. 6, 2018, (1 page). URL: https://www.youtube.com/watch?v=T68ILZ1aLQQ.

Lan Ren, Todd Sparks, Jianzhong Ruan, Frank Liou, "Process planning strategies for solid freeform fabrication of metal parts", Nov. 27, 2007, Journal of Manufacturing Systems 27 (2008) 158-165.

Samuel Clark Ligon, Robert Liska, Jurgen Stampfl, Matthias Gurr, and Rolf Mulhaupt, "Polymers for 3D Printing and Customized Additive Manufacturing", Aug. 9, 2017, Chem Rev., 117(15): 10212-10290.

Yuan Jina, Yong He, Guogiang Fu, Aibing Zhang, Jianke Du, "A non-retraction path planning approach for extrusion-based additive manufacturing", Aug. 5, 2016, Robotics and Computer-Integrated Manufacturing 48 (2017) 132-144.

Yu-an Jin, Yong He, Jian-zhong Fu, Wen-feng Gan, Zhi-wei Lin, "Optimization of tool-path generation for material extrusion-based additive manufacturing technology", Sep. 16, 2014, Additive Manufacturing 1-4 (2014) 32-47.

Yuan Jin, Jianke Du, Yong He, "Optimization of process planning for reducing material consumption in additive manufacturing", Oct. 31, 2016, Journal of Manufacturing Systems 44 (2017) 65-78.

Felix W. Baumann, and Dieter Roller, "Additive Manufacturing, Cloud-Based 3D Printing and Associated Services-Overview", Sep. 22, 2017, J. Manuf. Mater. Process. 2017, 1, 15; doi:10.3390/jmmp1020015.

* cited by examiner

FIG. 11

SYSTEMS AND METHODS FOR PRINTING COMPONENTS USING ADDITIVE MANUFACTURING

CROSS-REFERENCE TO RELATED APPLICATION(S)

This patent application is a continuation of and claims the benefit of priority to U.S. patent application Ser. No. 16/186,053, filed on Nov. 9, 2018, the entirety of which is incorporated herein by reference.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing.

BACKGROUND

Additive manufacturing techniques and processes generally involve the buildup of one or more materials, e.g., layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process commonly referred to as Fused Deposition Modeling (FDM) or Fused Layer Modeling (FLM) comprises melting a thin layer of thermoplastic material, and applying this material in layers to produce a final part. This is commonly accomplished by passing a continuous thin filament of thermoplastic material through a heated nozzle, or by passing thermoplastic material into an extruder with an attached nozzle, which melts and applies the melted thermoplastic material to a structure being printed, building up the structure. The melted thermoplastic material may be applied to the existing structure in layers, melting and fusing with the existing material (e.g., the previously deposited layers of the melted thermoplastic material of the structure), to produce a solid finished part.

The filament used in the aforementioned process may be produced, for example, using an extruder, which may include a steel extruder screw configured to rotate inside of a heated steel barrel. Thermoplastic material in the form of small pellets may be introduced into one end of the rotating screw. Friction from the rotating screw, combined with heat from the barrel may soften the thermoplastic material, which may then be forced under pressure through a small round opening in a die that is attached to the front of the extruder barrel. In doing so, a "string" of material may be extruded, after which the extruded string of material may be cooled and coiled up for use in a 3D printer or other additive manufacturing system.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of larger parts or a larger number of items.

In some instances, the process of 3D printing a part may involve a two-step process. This two-step process, commonly referred to as near-net-shape, may begin by printing a part to a size slightly larger than needed, e.g., printing using a larger bead, then machining, milling, or routing the part to the final size and shape. The additional time required to trim the part to a final size may be compensated for by the faster printing process.

A common method of additive manufacturing, or 3D printing, may include forming and extruding a bead of flowable material (e.g., molten thermoplastic), applying the bead of material in a strata of layers to form a facsimile of an article, and machining the facsimile to produce an end product. Such a process may be achieved using an extruder mounted on a computer numeric controlled (CNC) machine with controlled motion along at least the x-, y-, and z-axes. In some cases, the flowable material, such as, e.g., molten thermoplastic material, may be infused with a reinforcing material (e.g., strands of fiber or a combination of materials) to enhance the material's strength.

The flowable material, while generally hot and pliable, may be deposited upon a substrate (e.g., a mold), pressed down or otherwise flattened to some extent, and leveled to a consistent thickness, e.g., by means of a tangentially compensated roller. The roller may be mounted in or on a rotatable carriage, which may be operable to maintain the roller in an orientation tangential, e.g., perpendicular, to the deposited material (e.g., a print bead or beads). In some embodiments, the roller may be smooth and/or solid. The flattening process may aid in fusing a new layer of the flowable material to the previously deposited layer of the flowable material. The deposition process may be repeated so that each successive layer of flowable material is deposited upon an existing layer to build up and manufacture a desired component structure. In some instances, an oscillating plate may be used to flatten the bead of flowable material to a desired thickness, thus effecting fusion to the previously deposited layer of flowable material. In order to achieve proper bonding between printed layers, the temperature of the layer being printed upon must cool, and solidify sufficiently to support the pressures generated by the application of a new layer. The layer being printed upon must also be warm enough to fuse with the new layer. When executed properly, the new layer of flowable material may be deposited at a temperature sufficient to allow the new layer to melt and fuse with the new layer, thus producing a solid part.

Some CNC programs may generate a print program including a tool path for each layer using a "slicing process". The slicing process may divide or "slice" a computer model of the part to be printed into layers. Typically, slicing processes divide a part into layers having approximately the same print parameters. For example, the slicing process may use a constant thickness for each layer, e.g., a thickness approximately equal to the thickness of the print bead. After dividing the part into layers, a tool path for each layer is generated such that the tool path guides the beads of material being deposited to reproduce the shape of each layer. That is, the tool path directs movement of a nozzle for depositing the material in a layer.

During the slicing process, a number of print parameters for each layer may be taken into account such as, e.g., a width and/or a thickness of print bead, a width of the perimeter of the part, a start location and a stop location of an applicator head including the nozzle, an infill pattern, and a print speed. For example, slicing processes typically divide parts into layers having constant print parameters. Such slicing processes may be inefficient and limited. For example, by maintaining all printing parameters constant for every layer of a part, typical slicing programs cannot optimize print parameters of different sections of a part. It may be desirable, however, to produce a part using different print parameters at separate areas of the part, e.g., printing, an outside perimeter of the part with print beads having dimensions different from the print beads used to form the internal structures of the part.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. In one aspect, the present disclosure relates to systems and methods for dividing a model of a part into layers, each layer including print parameters, and using additive manufacturing to create the part.

When preparing a CAD model of a part to be printed, traditional methods may include generating models of an outside shape and any interior structures of the part. The models for the outside shape and the interior structures may be generated separately. Each of the models may then divided, or sliced, into a number of layers. Subsequently, tool paths may be determined for the layers to develop a printing program or process to manufacture the sections of the outside shape and the interior structures. After printing, each section separately, the sections may be assembled into the part. After assembly, a final print process may be executed to complete the part.

Alternatively, according to the present disclosure, a slicing process may divide the part to be printed into multiple sections, each with its own unique print parameters, before slicing the sections into layers. Each of these sections may be configured to be printed as part of a single printing process. In some examples, the sections may be processed by the slicing process so that the sections to fuse together when printed.

The print process developed from such a slicing process may begin by printing on a workpiece a first layer of a first section according to one or more print parameters. Then a first layer of a second section may be printed according to print parameters different and/or distinct from those used to print the first layer of the first section. The printing process may continue to repeat the steps of adjusting the printing parameters and printing a first layer for any subsequent sections. Upon completing the printing of the first layer of each section, the steps may be repeated for any additional layers of each section until all sections have been printed. Additionally, or alternatively, the printing process developed from the slicing process may print the layers of the first section interspersed with printing layers of the second section, e.g., one or more layers of the first section may be printed before printing a layer of the second piece.

A print position of each section of the part processed by the slicing process may be adjusted so that areas where the sections are designed to fuse together are located in sufficient proximity for the print beads of each section to overlap sufficiently to joining the sections together.

In some examples, a section processed by the slicing process may be located at a distance above the worktable instead of directly on the worktable. For example, an elevated section may be located atop a base section. In this case, the first layer of the elevated section may not be printed until a collective height of the layers that have been printed reaches the height above the worktable equal to the first layer of the elevated section. In this way, the base section (and any intervening sections) may be printed until the layers of the base section (and any intervening sections) reach the vertical location of the elevated section, and then the elevated section may be printed on top of the base section. By locating sections at varying heights above the worktable, the slicing process may increase the ability to optimize the printing process for each section.

By processing parts section-by-section the slicing process may increase the ability to utilize advanced design tools when positioning a section for printing. For example, a wall of one (e.g., a first) section may serve as a wall of a second section, thereby eliminating the requirement of positioning a wall of the first section sufficiently adjacent to a wall of the second section so that the walls mesh together.

In one embodiment of the present disclosure, a method of forming a part using additive manufacturing may include receiving, at a computer numeric controlled (CNC) machine, a computer aided design (CAD) model of the part. The method may further include dividing the CAD model into plurality of sections. The method may further include slicing each of the plurality of sections into a plurality of layers. Each section may include a distinct set of print parameters. The method may further include depositing a flowable material onto a worktable according the set of print parameters for each section of the of the plurality of sections to manufacture the part.

In an additional or alternative embodiment of the present disclosure, a method of forming a part using additive manufacturing may include receiving at an electronic device, a computer aided design (CAD) model of the part. The method may further include dividing the CAD model into a first section and a second section. The method may further include selecting a first set of print parameters for the first section. The method may further include selecting a second set of print parameters for the second section. The first set of print parameters may be different from the second set of print parameters. The method may further include slicing the first section into a first set of layers and slicing the second section into a second set of layers. The method may further include depositing a flowable material onto a surface according the first set of print parameters and the second set of print parameters. The first set of layers and the second set of layers may be deposited so as to be interspersed with one another.

In an additional or alternative embodiment of the present disclosure, a method of forming a part using additive manufacturing may include receiving at an electronic device, a computer aided design (CAD) model of the part. The method may further include dividing the CAD model into a plurality of sections. The method may further include slicing each of the plurality of sections into a plurality of layers. Each layer may have a plurality of print parameters. The method may further include depositing a flowable material onto a substrate according to the plurality of print parameters for each of the plurality of layers. The plurality of sections may include a first section and a second section. The first section and the second section may each include a set of layers of the plurality of layers. The print parameters of the set of layers of the first section may differ from the print parameters of the set of layers of the second section.

As used herein, the terms "comprises," "comprising," or any other variation thereof, are intended to cover a non-exclusive inclusion, such as a process, method, article, or apparatus. The term "exemplary" is used in the sense of "example," rather than "ideal." As used herein, the terms "about," "generally," "substantially," and "approximately," indicate a range of values within +/−5% of the stated value unless otherwise stated. As used herein, the term "part" refers to a finished product of the printing process. Each part may comprise one or more sections. As used herein the term "section" refers to a portion or division of a part. For example a section may be a plurality of layers of a part, a quadrant, hemisphere, or other division of the part, an internal structure of a part, or an outside structure of a part.

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

FIG. 11 is an exemplary screen shot of a graphical user interface prompting input of print parameters of a passes subcategory of a boundary category;

DETAILED DESCRIPTION

The present disclosure is drawn to, among other things, methods and apparatus for fabricating components, parts, or articles via additive manufacturing such as, e.g., 3D printing. Specifically, the methods and apparatus described herein may be drawn to a method of dividing a part into sections and layers.

For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing.

Figure 1:
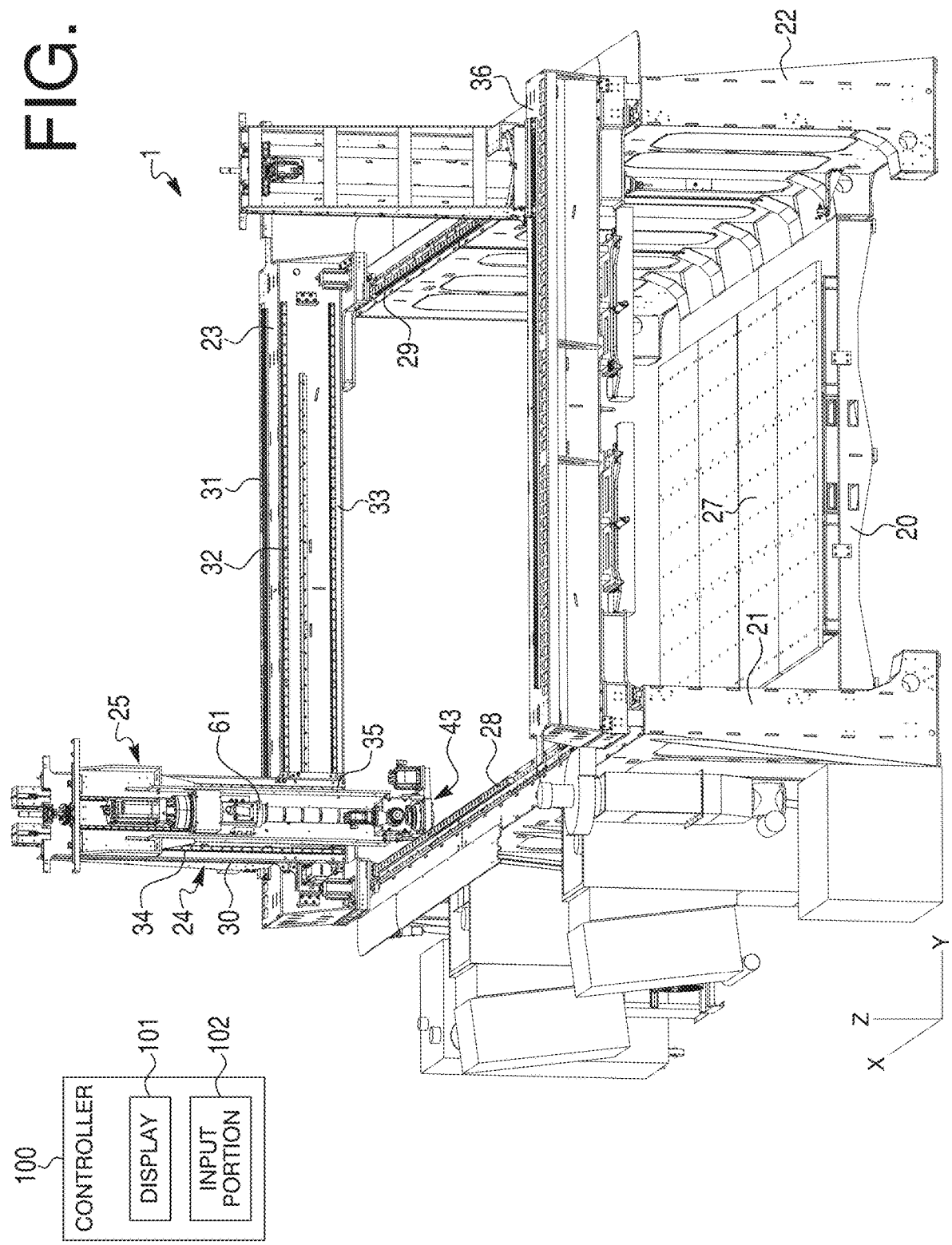
FIG. 1 is a perspective view of an exemplary CNC machine operable pursuant to an additive manufacturing process to form articles or parts, according to an aspect of the present disclosure.

Referring to FIG. 1, there is illustrated a CNC machine 1 embodying aspects of the present disclosure. CNC machine 1 may include a controller 100 operatively connected to CNC machine 1 for displacing an applicator head 43 (see FIG. 2) along a longitudinal line of travel, or x-axis, a transverse line of travel, or a y-axis, and a vertical line of travel, or z-axis, in accordance with a program, (e.g., a print program or process) inputted or loaded into the controller 100 for performing an additive manufacturing process to form a desired component or part, as will be described in further detail below. Controller 100 may include a display 101 (e.g., screen) and an input portion 102, as schematically illustrated in FIG. 1. Optionally, input portion 102 may include one or more of a keyboard, buttons, joystick, mouse, or the like, for entry of data by a user. Optionally, display 101 may be a touch screen display in which data and/or user selections may be directly input to controller 100. In such a case, controller 100 may not include input portion 102.

Figure 2:
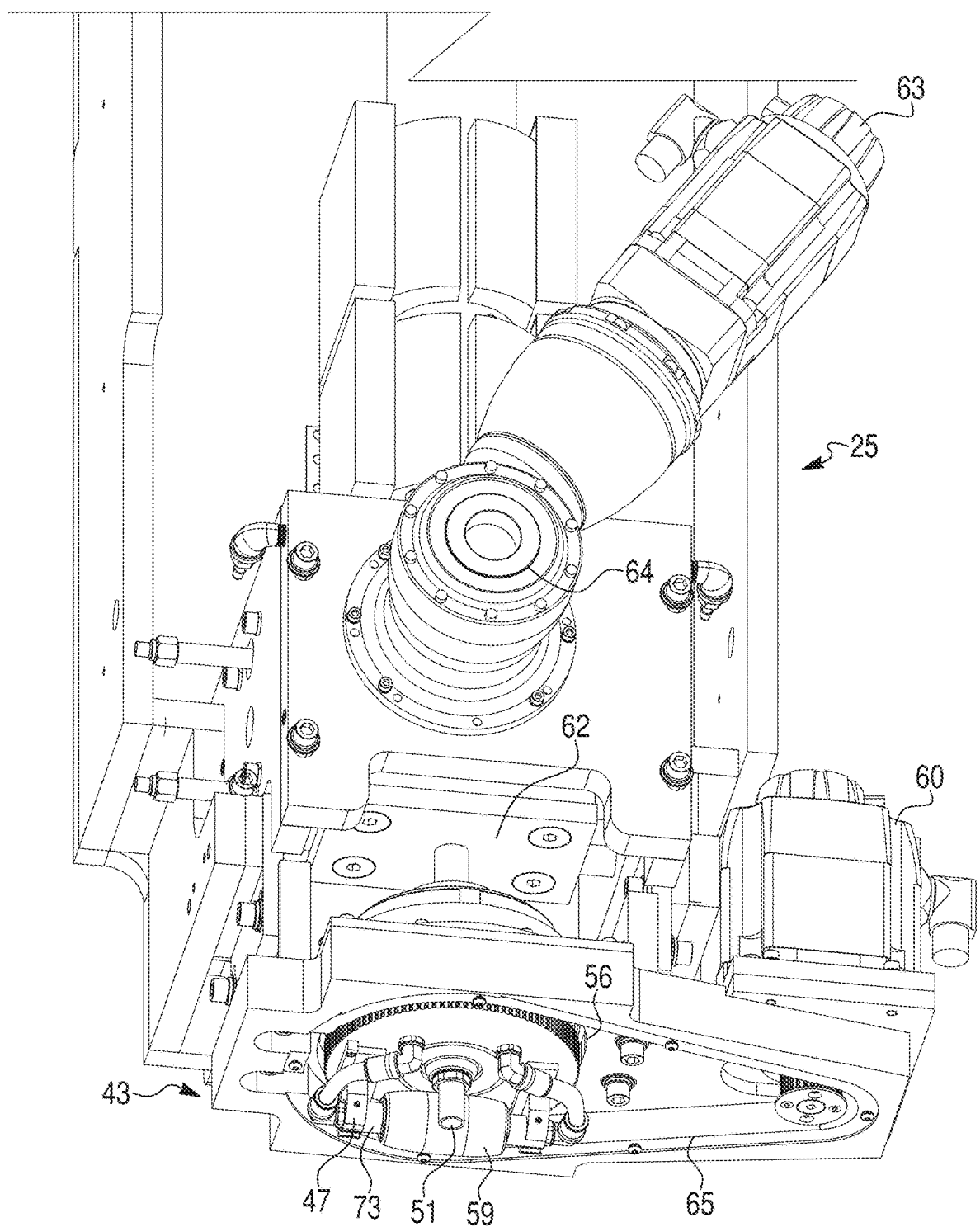
FIG. 2 is an enlarged perspective view of an exemplary carrier and applicator head assembly of the exemplary CNC machine shown in FIG. 1.

CNC machine 1 may be configured to print or otherwise build 3D parts from digital representations of the 3D parts (e.g., AMF and STL format files). For example, in an extrusion-based additive manufacturing system (e.g., a 3D printing machine), a 3D part may be printed from a digital representation of the 3D part in a layer-by-layer manner by extruding a flowable material (e.g., thermoplastic material with or without reinforcements). With reference to FIG. 2, the flowable material may be extruded through an extrusion tip or nozzle 51 carried by and applicator head 43 of the CNC machine 1, and the flowable material may be deposited as a sequence of beads or layers on a substrate in an x-y plane. The extruded, flowable material may fuse to a previously deposited layer of material and may solidify upon a drop (e.g., decrease) in temperature. The position of applicator head 43 relative to the substrate may then be incrementally advanced along a z-axis (perpendicular to the x-y plane), and the process may then be repeated to form a 3D part resembling the digital representation.

CNC machine 1, as shown in FIG. 1, includes a bed 20 provided with a pair of transversely spaced side walls 21 and 22, a printing gantry 23 and a trimming gantry 36 supported on opposing side walls 21 and 22, a carriage 24 mounted on printing gantry 23, a carrier 25 mounted on carriage 24, an extruder 61 having and extruder screw (not shown), and the applicator head (also referred herein as an applicator assembly) 43 mounted on carrier 25. Located on bed 20 between side walls 21 and 22 is a worktable 27 provided with a support surface. The support surface may be disposed in an x-y plane and may be fixed, or displaceable, along an x-axis and/or a y-axis. For example, in a displaceable version, worktable 27 may be displaceable along a set of rails mounted to bed 20. Displacement of worktable 27 may be achieved using one or more servomotors and one or more of guide rails mounted on bed 20 and operatively connected to worktable 27. Printing gantry 23 is disposed along the y-axis, supported on side walls 21 and 22. In FIG. 1, printing gantry 23 is mounted on the set of guide rails 28 and 29, which are located along a top surface of side walls 21 and 22.

Printing gantry 23 may either be fixedly or displaceably mounted, and in some aspects, printing gantry 23 may be disposed along the x-axis. In an exemplary displaceable version, one or more servomotors may control movement of printing gantry 23. For example, one or more servomotors may be mounted on printing gantry 23 and operatively connected to tracks, e.g., guide rails 28, 29, provided on the side walls 21 and 22 of bed 20.

Carriage 24 is supported on printing gantry 23 and is provided with a support member 30 mounted on and displaceable along one or more guide rails 31, 32 and 33 provided on printing gantry 23. Carriage 24 may be displaceable along a y-axis on one or more guide rails 31, 32 and 33 by a servomotor mounted on the printing gantry 23 and operatively connected to support member 30. Carrier 25 is mounted on one or more vertically disposed guide rails 34 and 35 supported on carriage 24 for displacement of carrier 25 relative to carriage 24 along the z-axis. Carrier 25 may be displaceable along the z-axis by a servomotor mounted on carriage 24 and operatively connected to carrier 25.

Figure 3:
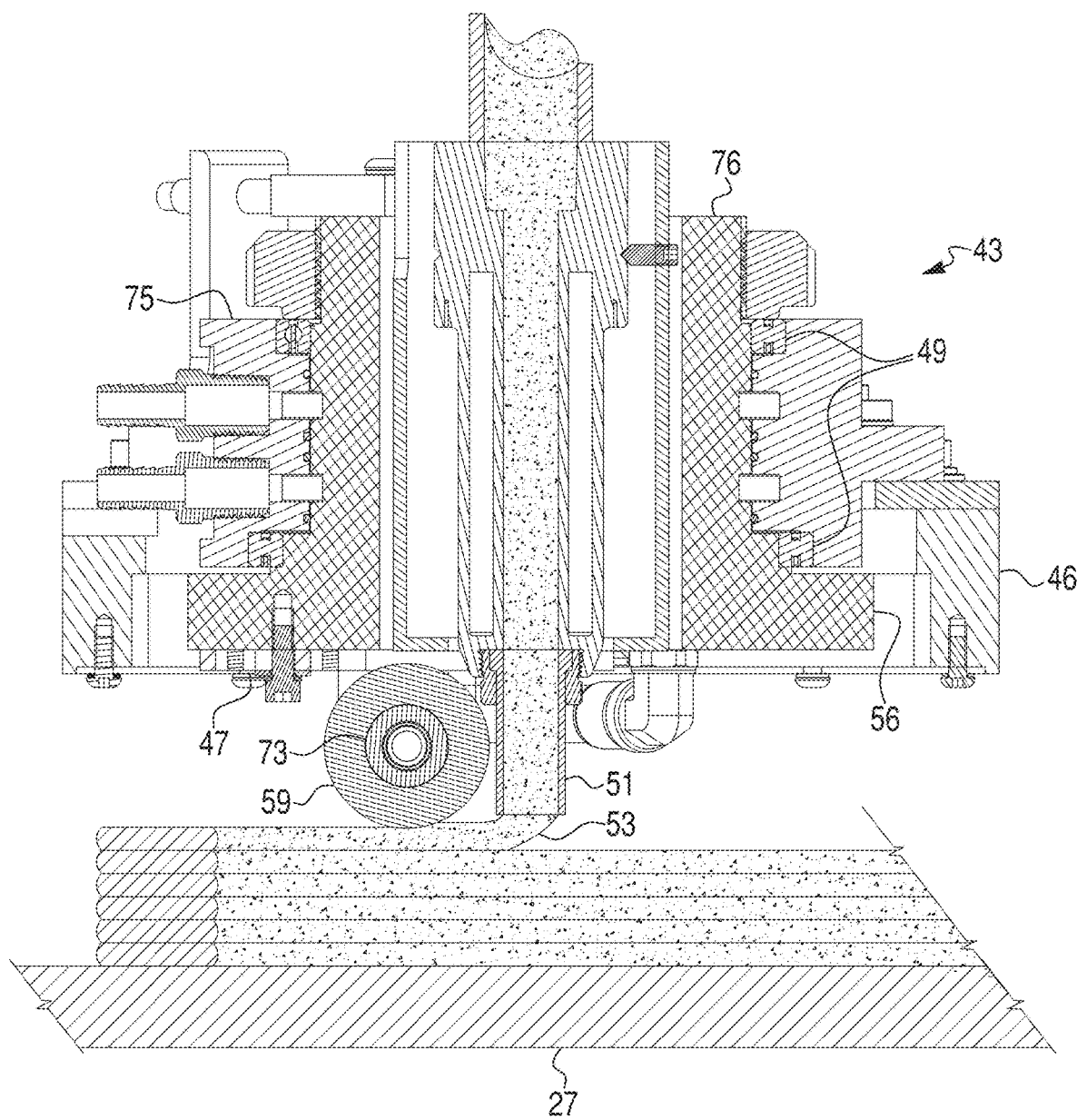
FIG. 3 is an enlarged cutaway view of an exemplary applicator head assembly shown in FIG. 2.

As best shown in FIG. 2, also fixedly mounted to the bottom of carrier 25) is a positive displacement gear pump 62 (e.g., melt pump), which may be driven by a servomotor 63, through a gearbox 64. Said gear pump 62 receives molten plastic from extruder 61, shown in FIG. 1. A compression roller 59, rotatable about a nonrotatable (e.g., fixed) axle 73, for compressing deposited flowable material (e.g., thermoplastic material) may be mounted on a carrier bracket 47. Roller 59 may be movably mounted on carrier bracket 47, for example, rotatably or pivotably mounted. Roller 59 may be mounted so that a center portion of roller 59 is aligned with a nozzle 51 of applicator head 43, and roller 59 may be oriented tangentially to nozzle 51. Roller 59 may be mounted relative to nozzle 51 so that material, e.g., one or more beads of flowable material (such as thermoplastic resins), discharged from nozzle 51 are smoothed, flattened, leveled, and/or compressed by roller 59, as depicted in FIG. 3. One or more servomotors 60 may be configured to move, e.g., rotationally displace, carrier bracket 47 via a pulley 56 and belt 65 arrangement. In some embodiments, carrier bracket 47 may be rotationally displaced via a sprocket and drive-chain arrangement (not shown), or by any other suitable mechanism.

With continuing reference to FIG. 3, applicator head 43 may include a housing 46 having a rotary union mounted therein. Such a rotary union may include an inner hub 76 rotatably mounted within and relative to an outer housing 75. For example, inner hub 76 may rotate about a longitudinal axis thereof relative to outer housing 75 via one or more roller bearings 49. Carrier bracket 47 may be mounted, e.g., fixedly mounted to inner hub 76, journaled in roller bearing 49. Roller bearing 49 may allow roller 59 to rotate about nozzle 51.

As shown in FIGS. 2-3, an oversized molten bead of a material 53 (e.g., a thermoplastic material) under pressure from a source disposed on carrier 25 (e.g., one or more of extruder 61 and an associated polymer or gear pump 62) may be flowed to applicator head 43, which may be fixedly (or removably) connected to, and in communication with nozzle 51. In use, material 53 (e.g., melted thermoplastic material) may be heated sufficiently to form a large molten bead thereof, which may be delivered through applicator nozzle 51 to form multiple rows of deposited material 53 on a surface of worktable 27. In some embodiments, beads of molten material deposited by nozzle 51 may be substantially round in shape prior to being compressed by roller 59. Exemplary large beads may range in size from approximately 0.4 inches to over 1 inch in diameter. For example, a 0.5 inch bead may be deposited by nozzle 51 and then flattened by roller 59 to a layer approximately 0.2 inches thick by approximately 0.83 inches wide. Such large beads of molten material may be flattened, leveled, smoothed, and/or fused to adjoining layers by roller 59.

As mentioned above, CNC machine 1 may be controlled via a program, e.g. a print program to produce a part. The print program may be part of, or generated from, a slicing process.

The slicing process may receive a CAD model (or models) of the part to be printed and slice the part into sections having a plurality of layers, each section having their own print properties, for printing. The CAD model may be a 3D or 2D representation of the part to be printed. In some examples, the CAD model may include a model of an outside shape of the part and separate models of each interior structure of the part. The slicing process may simplify the CAD model which may allow the print process to be optimized. In some aspects of the present disclosure, the part is processed by the slicing process as multiple sections, each section having unique print parameters. These sections may be printed so that the individual sections or sections join together to form the part. The slicing process may assemble the sections and/or layers into a print program or process to manufacture the part to be printed. The slicing process may execute or transmit the print program to CNC machine 1 to print or otherwise manufacture the part.

The slicing process may be executed by a user via controller 100 of CNC machine 1 or an external computing device having a controller, e.g., a processor or microprocessor. Exemplary computing devices include, but are not limited to, a desktop computer or workstation, a laptop computer, a mobile handset, a personal digital assistant ("PDA"), a smart phone, a server, or any combination of these or other computing devices having a display, at least one controller (e.g. a processor or microprocessor), a memory, and one or more input devices. The user input device(s) may include any type or combination of input/ output devices, such as, e.g., a keyboard, a touchpad, a mouse, a touchscreen, a camera, a stylus, and/or a scanner (e.g., a laser scanner).

The disclosed slicing process may include a user viewing, inputting, or otherwise executing the slicing process via a graphical user interface ("GUI" or "interface") displayed by controller 100 (e.g., via display 101) and/or another electronic device. The interface may include one or prompts and/or other elements allowing or requesting that the user to input, select, or otherwise determine parameters of the slicing process. Prompts for user input may include, but are not limited to, links, buttons, images, check boxes, radio buttons, text boxes, and menus. As used herein, a print parameter referred to as "a selection" by the user may include the user selecting a value from a number of preset values, checking a check box, clicking a radio button, or otherwise making a selection using one or more prompts.

Figure 4:
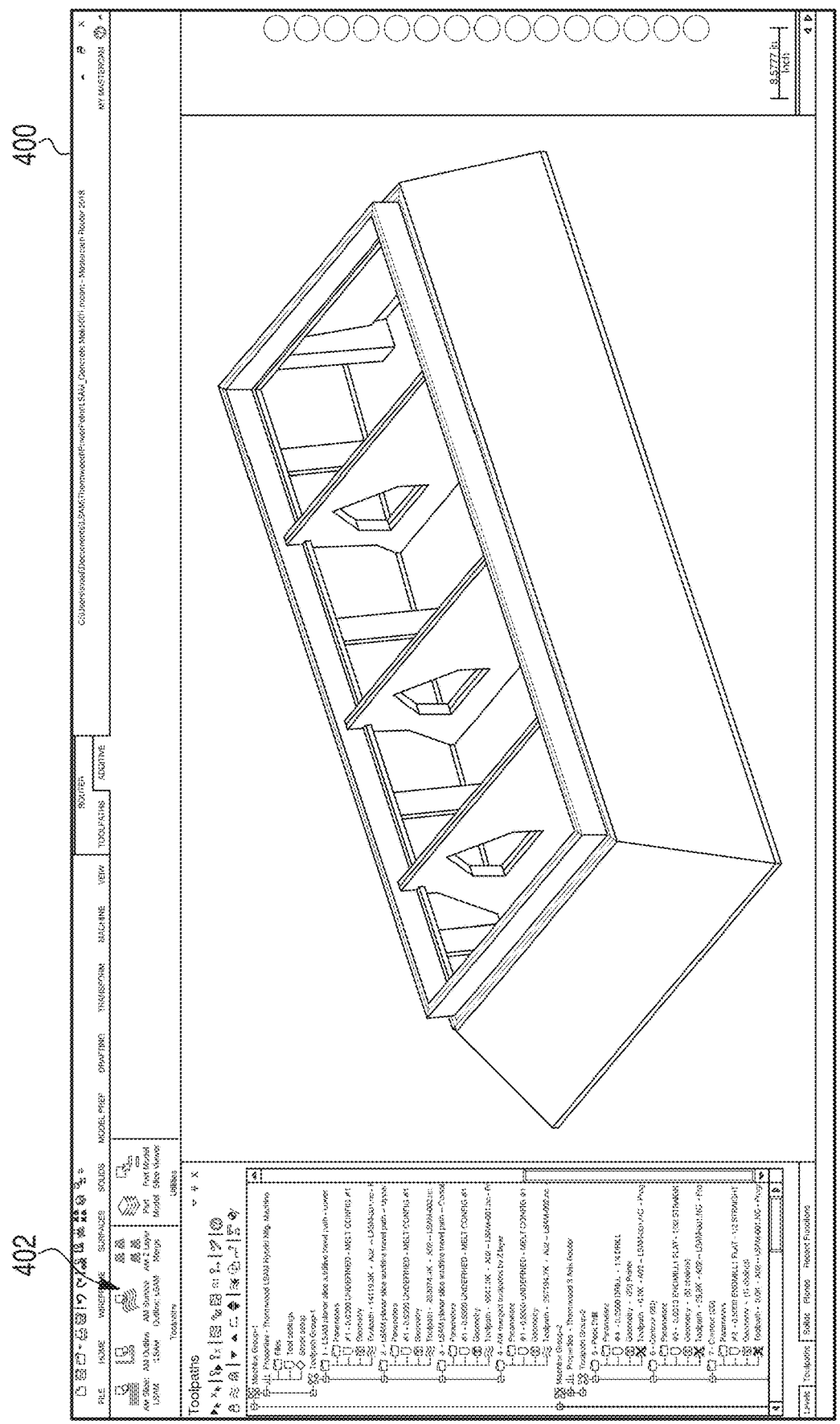
FIG. 4 is an exemplary screen shot of a graphical user interface for selection of a toolpath type for use in the slicing process.

Turning now to FIG. 4, an interface 400 may present the user with a part model viewer and a part model slice viewer. The part model viewer may allow the user to digitally assemble a part model of the individual sections of a part to be printed, or of the whole part (e.g., including the individual sections merged together). The part model slice viewer may allow the user to view the CAD model slice-by-slice for each section or the part to be produced as a whole. Additionally, the part model slice viewer may permit the user to view a net model, a print tool path, or a physical print beads model of the section or part to be printed. The user may reference the print model viewer and/or the part model slice viewer before, during, or after executing the slicing process.

Interface 400 may include a prompt, e.g., an additive manufacturing toolbar 402, for a user to select a toolpath type and/or other parameters of the slicing and printing processes. The toolpath types may specify the slicing process corresponding to the CAD model(s). The toolpath types may further define how the CAD model(s) of the part to be printed are divided into sections, and how each section is further divided into layers via the slicing process. Exemplary tool path types may include an AM Slice type, an AM Outline type, and an AM Surface Outline type. The AM Slice toolpath type may specify that the slicing process includes dividing a CAD model of solids, surfaces, or polygonal mesh into cross sectional layers, each layer having a thickness determined in part based on the layer height (e.g., spacing) printing parameter. The AM Outline toolpath type may specify that the slicing process includes receiving a 2D line drawing of the part or section to produce a layer or multiple layers that follow the path of the line drawing. Using the AM Outline toolpath type, the total number of layers and layer height produced by the slicing process may be determined based a parameter input by the user. The AM Surface toolpath type may specify that the CAD model(s) include a 2D line drawing of the part or section, and that the drawing is divided into a layer or multiple layers that follow the path of the solids, surfaces, or polygonal mesh. The number of layers in height produced by the AM Surface Outline toolpath type may be determined based on a height of the section or part. Interface 400 may include an AM Z Merge selection for combining toolpaths. The AM Z Layer Merge selection may combine each of the different toolpaths (and their respective print parameters) as generated by the slicing process into a single printing process for all sections and/or layers of the part to be printed. Thus, the slicing process may receive electronic models, e.g., CAD models, having multiple types of geometries, such as, e.g., solids, surfaces, polygonal mesh, and 2D drawings to produce and/or execute a printing process for manufacturing the part.

Once the toolpath type has been selected, a category of print parameters may be selected. The categories of print parameters may include, but are not limited to, general, boundary, and fill. In some examples, the selected tool path type may determine the print parameter categories that may be defined by the user. For example, the AM Outline and/or AM Surface Outline may not include a fill category.

Figure 5:
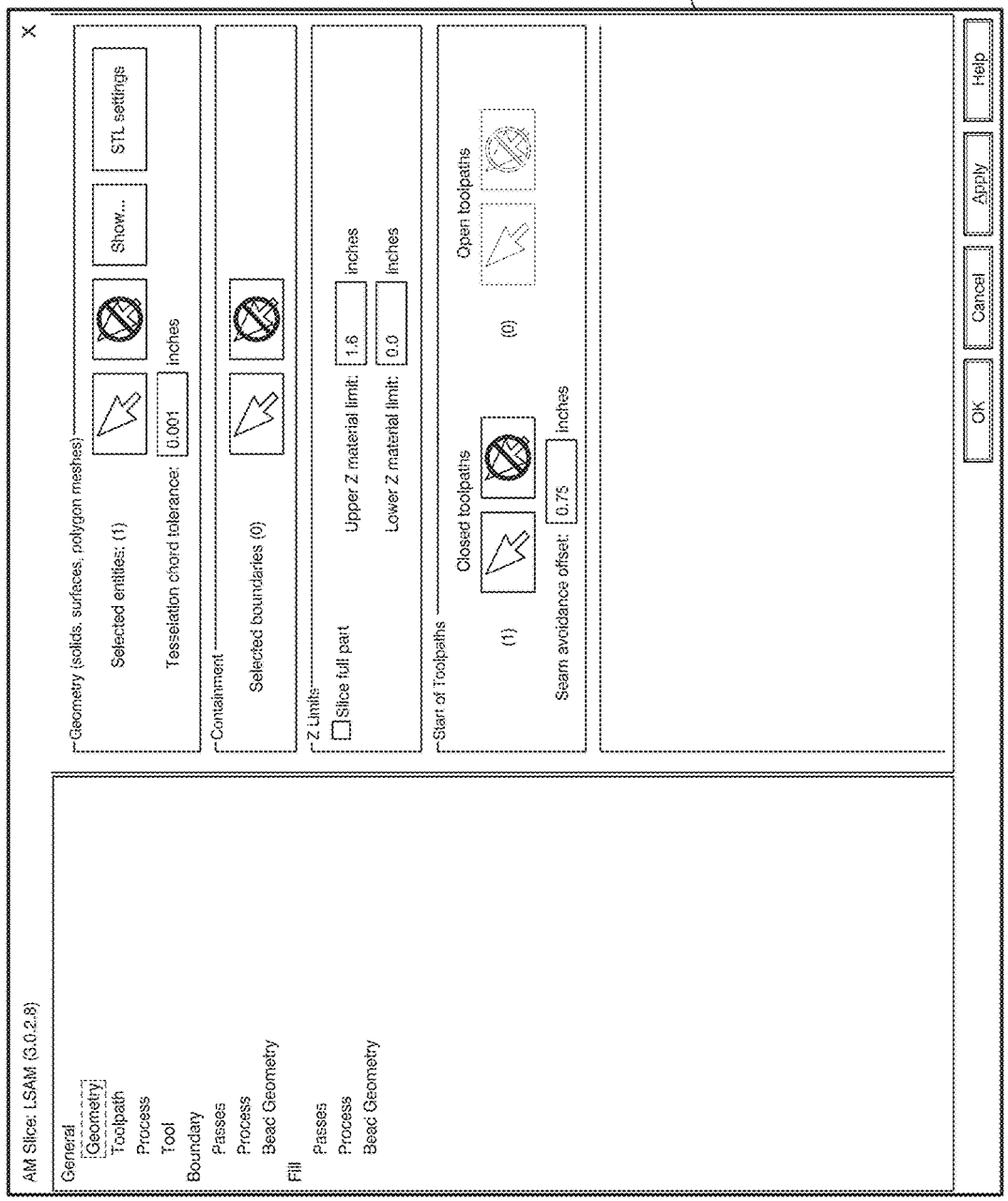
FIG. 5 is an exemplary screen shot of a graphical user interface prompting the input of print parameters of a geometry subcategory.
Figure 6:
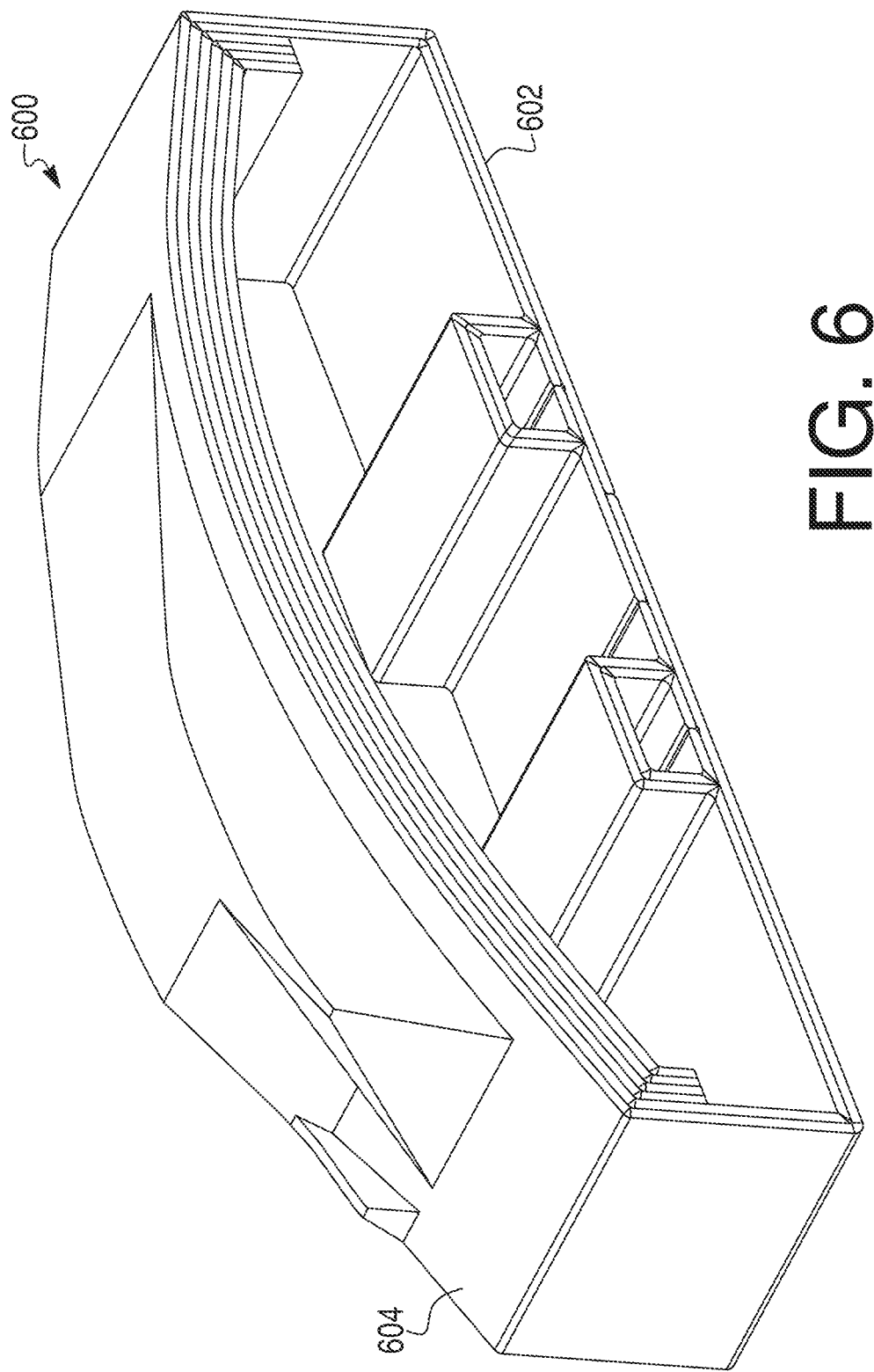
FIG. 6 is a perspective view of an exemplary part manufactured using a printing process generated by the slicing process of the present disclosure.

FIG. 5 depicts a user interface 500 prompting the user to input values or otherwise specify the print parameters of a geometry subcategory within the general category. The geometry subcategory may include print parameters such as a tessellation chord tolerance parameter, a containment boundaries parameter, a Z limits parameter, a toolpath start locations parameter, and a seam avoidance offset parameter. The tessellation chord tolerance parameter is a value indicative of the accuracy with which the toolpath follows the contour of the section or part. In some examples, the tessellation chord tolerance parameter may be changed or selected so as to smooth the toolpaths, e.g., by increasing the tessellation chord tolerance parameter. The containment boundaries parameter refers to an inside surface and an outside surface of the part. The area formed between the inside surface and the outside surface may be referred to as the "fill." For example, a donut shaped section may include an inner circle corresponding to the inner surface (e.g., the hole), an outer circle circumferentially surrounding the inner circle and corresponding to the outer surface, and an area formed between the inner circle and the outer circle corresponding to the fill. In some examples, the containment boundaries may have different thicknesses in different areas. For example, with reference to FIG. 6, a part 600 may include a top side 604 having six boundary layers and a bottom side 602 including two boundary layers.

Figure 7B:
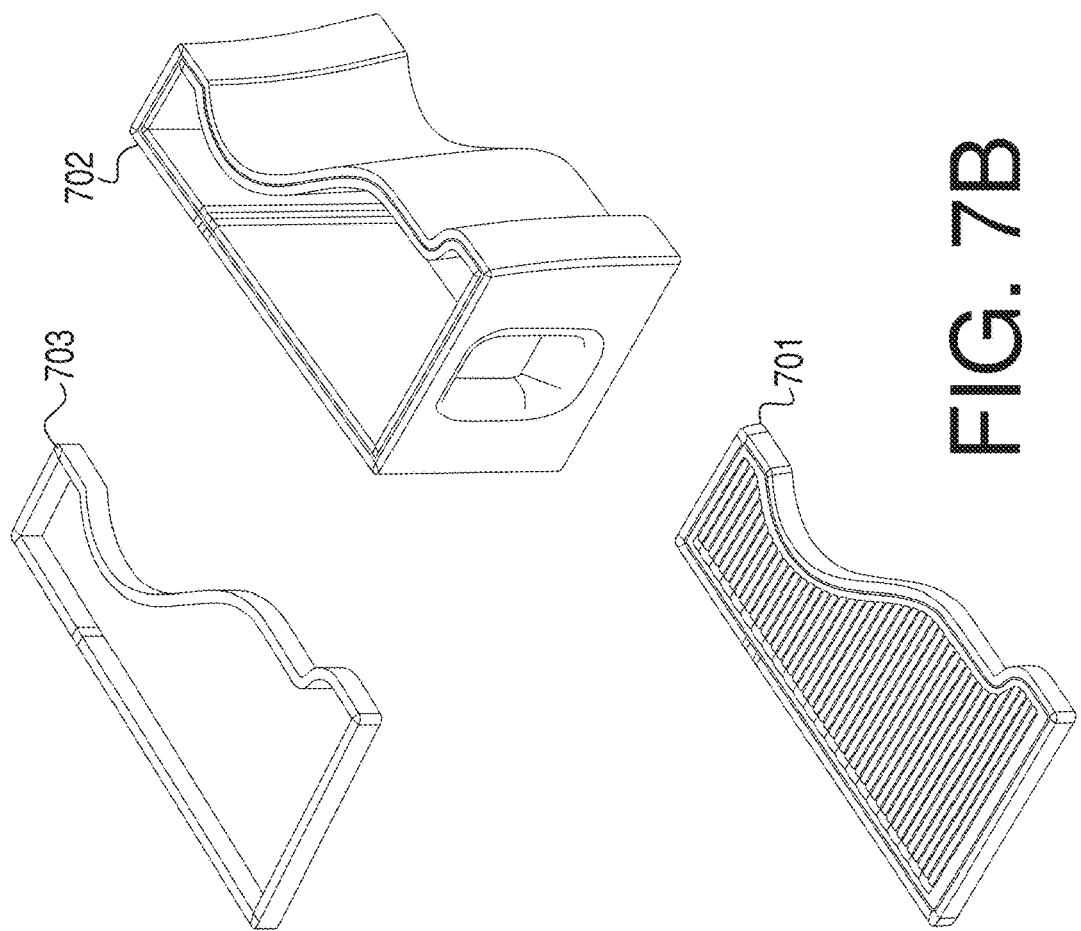
FIG. 7B is an exploded view of the exemplary part of FIG. 7A, illustrating the various subsections thereof.
Figure 7A:
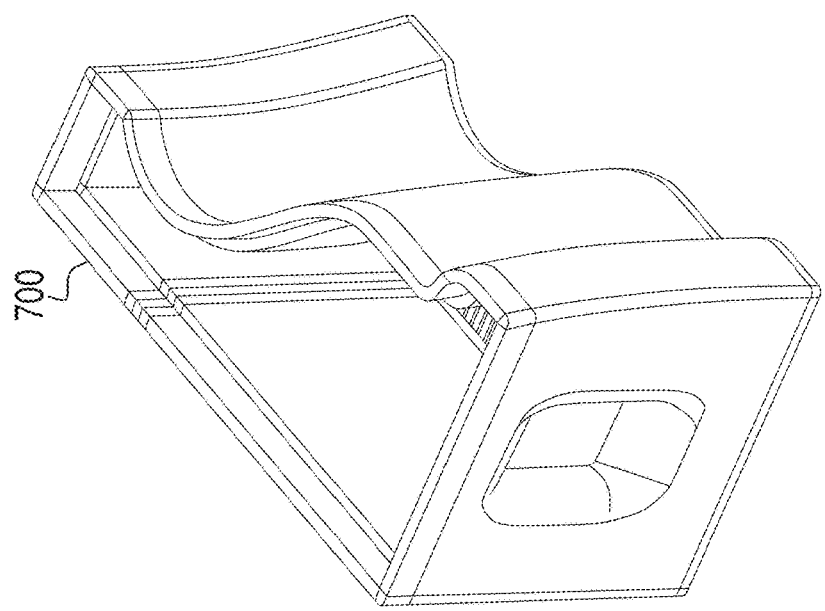
FIG. 7A is a perspective view of an additional exemplary part manufactured using a printing process generated by the slicing process of the present disclosure.

Turning back to FIG. 5, the Z Limits print parameters may include a lower Z material limit and an upper Z material limit. Additionally or alternatively, the interface may include a full part parameter which may be selected so that the lower Z material limit is set at a bottom surface of the section being printed and an upper Z material limit defined a distance from the bottom surface to a surface having the greatest height from the bottom surface. The distance between the lower Z material limit and the upper Z material limit may define a range of heights for which layers of the section may be determined by the slicing process. The Z limits print parameters may enable users to select an entire electronic model (e.g., CAD model/drawing) of a part or a section of the part defined between the lower Z material limit and the upper Z material limit for processing via the slicing process. For example, the section of the CAD model may be defined as any portion of the CAD model having a height above the worktable 27 that is 2 inches to 6 inches. Additionally or alternatively, the Z limit print parameters may be defined so that different printing parameters may be applied to separate heights of the same section. For example a part 700 shown in FIGS. 7A and 7B includes a bottom section 701, a middle section 702, and a top section 701, each section defined by Z limits print parameters of varying heights. Further, each of the bottom section 701, the middle section 702, and the top section 703 has different print parameters, e.g., different boundary layers and fill styles. The bottom section 701 has two boundary layers with a fill between the boundary layers. The middle section 702 has two boundary layers. The top section 703 has only one boundary layer.

With reference again to FIG. 5, the start point location set of print parameters may include an open toolpath parameter, a close toolpath parameter, and a seam avoidance offset parameter. The open toolpath parameter and the closed toolpath parameter allow the user to select geometry to define where the toolpath starts on any given layer. The seam avoidance offset parameter is a distance a start and a stop seam location are offset from one another between print layers.

Figure 8:
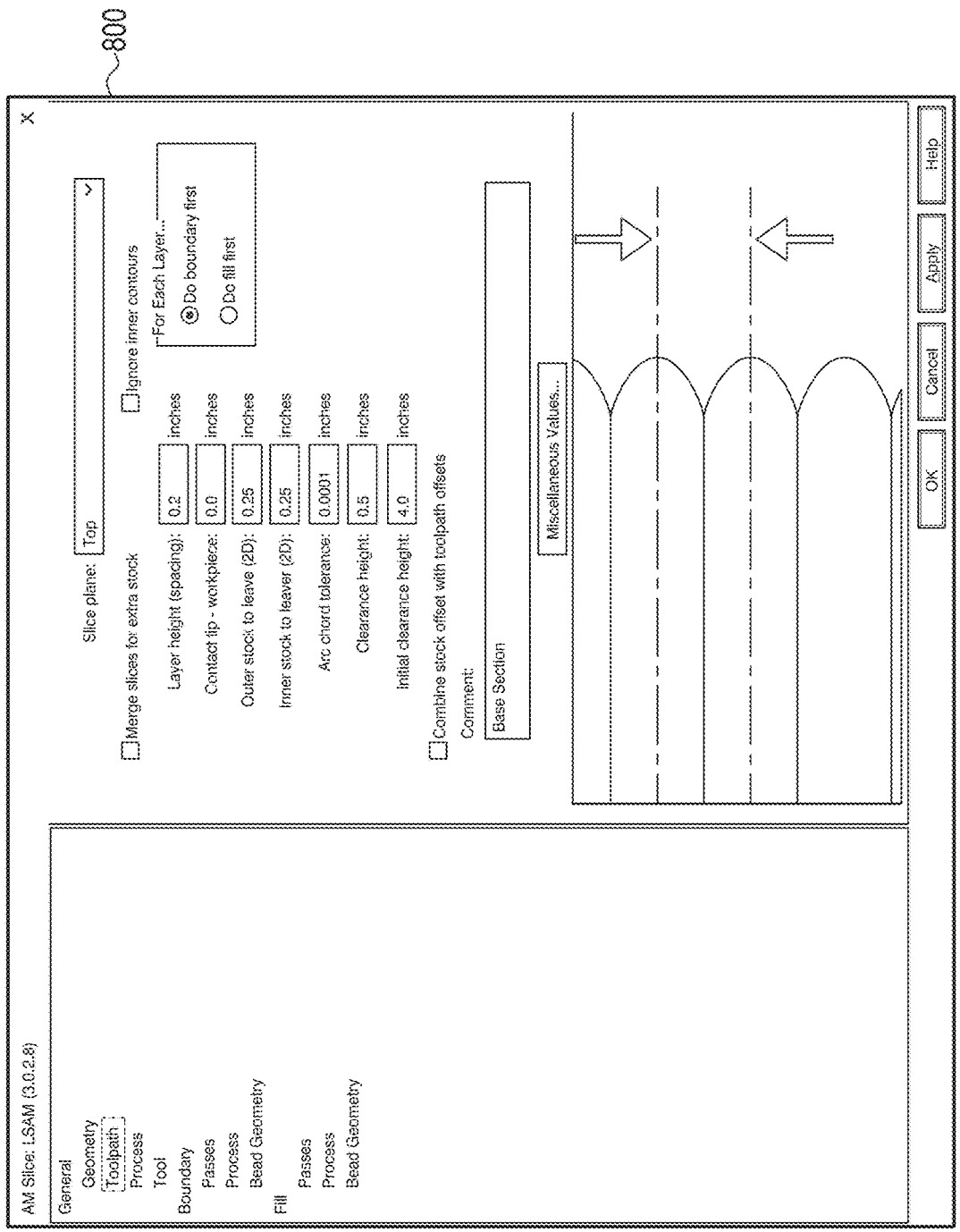
FIG. 8 is an exemplary screen shot of a graphical user interface prompting input of print parameters of the toolpath subcategory of the general category.

In addition to the geometry subcategory, the general category may include a toolpath subcategory. FIG. 8 shows an exemplary interface 800 through which a user may input values for the print parameters included in the toolpath subcategory. The toolpath subcategory may include print parameters or sets of print parameters such as, e.g., a slice plane parameter, a merge slices for extra stock parameter, an ignore inner contours parameter, a layer order parameter, a layer height (spacing) parameter, a contact tip-workpiece parameter, an outer stock to leave (2D) parameter, an inner stock to leave (2D) parameter, an arc chord tolerance parameter, a clearance height parameter, an initial clear height parameter, and a combine stock offset with toolpath offsets parameter. The slice plane parameter defines a plane from which the CAD model will be sliced. The slice plane parameter may be selected from a number of preset values, such as, e.g., top, side, etc. Additionally or alternatively, the slice plane parameter may be determined by controller 100 or input by the user. The merge slices for extra stock parameter may compare an outline of a slice of a layer selected by the user (the "selected layer") to an outline of a layer on which the selected layer will be applied (the "previous layer") and an outline of a layer that will be applied on top of the selected layer (the "subsequent layer"). The merge slices for extra stock parameter may then select the outline having the greatest surface area among the selected layer, the previous layer, and the subsequent layer for use in producing the toolpath for the current layer. The ignore inner contours parameter may be a selection of whether or not the inner contours are removed from consideration during the slicing process. The layer order set of print parameters may be a selection of whether the boundary or fill of each layer is deposited first. The layer height (spacing) print parameter defines a measurement of a thickness of each layer to be produced by the slicing process. The contact tip-workpiece parameter is a distance above worktable 27 at which the applicator head 43 is positioned before beginning the printing process.

With continued reference to FIG. 8, the contact-tip workpiece parameter is measured relative to the Z limits. For example, if the lower Z material limit is defined as 2 inches, a value of −2 inches may be input to define the contact tip-workpiece print parameter to position the applicator head 43 on the worktable 27, instead of 2 inches above the worktable 27, when beginning the print process. The outer stock to leave (2D) parameter is a distance the bead being deposited is offset from an outside surface of the outside contour of the section being printed. The inner stock to leave parameter is a distance the bead being deposited is offset from an inside surface of the inside contour of the section. The arc chord tolerance parameter is a distance controlling the fit of the arcs of the applicator head 43 to the toolpath. In some examples, the arc chord tolerance parameter may be adjusted or selected to smooth out the toolpath. For example, decreasing the value of the arc chord tolerance may produce arcs over the toolpath having a smoother shape. The clearance height parameter is a height above worktable 27. The applicator head 43 moves to this height between printing separate layers. The initial clearance height parameter is a height above worktable 27 to which applicator head 43 moves before initiating the printing process. The combine stock offset with toolpath offset parameter is a selection that determines whether the distances of the stock offset and the toolpath offset are combined into a single value when executing the slicing process.

Figure 9:
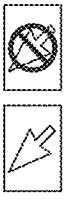
FIG. 9 is an exemplary screen shot of a graphical user interface prompting input of print parameters of the process subcategory of the general category.

FIG. 9 depicts a user interface 900 that allows the user to input values or otherwise specify print parameters included in the process subcategory of the general category. Exemplary print parameters within the process subcategory include a rafts parameter, a stock on top parameter, a melt settings parameter, a void detection parameter, a pull-back parameter, and a smoothing parameter. The rafts parameter refers to a number of layers printed before the layers of the part or section being printed are deposited. For example, if the rafts parameter is a value of 2, the applicator head 43 will deposit 2 layers before depositing the first layer of the part or section being printed. The stock on top parameter is a number of layers printed on a top layer of the part or section or part being printed. The top layer is the layer having the greatest Z axis height of the part or section. The top layer does not refer to peak areas of the part or section, e.g., an area of a layer having a height less than another layer, wherein no layers are deposited on top of the area. For example, a part may have a middle layer below the top layer. The middle layer may include a peak, e.g., a portion of the middle layer where no material is deposited. In this example, the stock on top parameter defines the number of layers deposited only on the top layer even though no layers will be deposited on the middle layer at the peak. The melt settings parameter defines the percentage by which the speed of the gear pump (measured in RPM) is reduced on overlapping beads during operation of the CNC machine 1. The melt setting print parameter may be changed to reduce buildup from depositing one bead adjacent to the next. The void detection set of print parameters refer to parameters that define the fill for any voids detected during an analysis of the layers of the part or section performed during the slicing process.

The pull-back parameters include a selection of whether or not to take a pull-back process into account when executing the slicing process, and the corresponding parameters for that pull-back process. A pull-back process may be used to avoid removing excess material from corners of the part. In some examples, if a pull-back process is not used when printing a corner of a part the roller 59 may disengage from the bead. Then, when the roller 59 reengages with the bead, the roller 59 may inadvertently push material away from the corner. The pull-back length parameter is a distance from a corner at which the pull-back process may begin. Upon reaching the distance from the corner specified by the pull-back length parameter, the roller 59 may be moved away from the corner by the distance input for the pull-back extensions parameter. In some examples, pull-back may be referred to as "corner-pull-back." The smoothing print parameters may include a maintain smooth curves parameter, a remove small polygons parameter, a never start in a corner parameter, and a minimum polygon angle parameter. The smoothing print parameters may alter or adjust the toolpaths of a part or section to smooth any curves.

Figure 10:
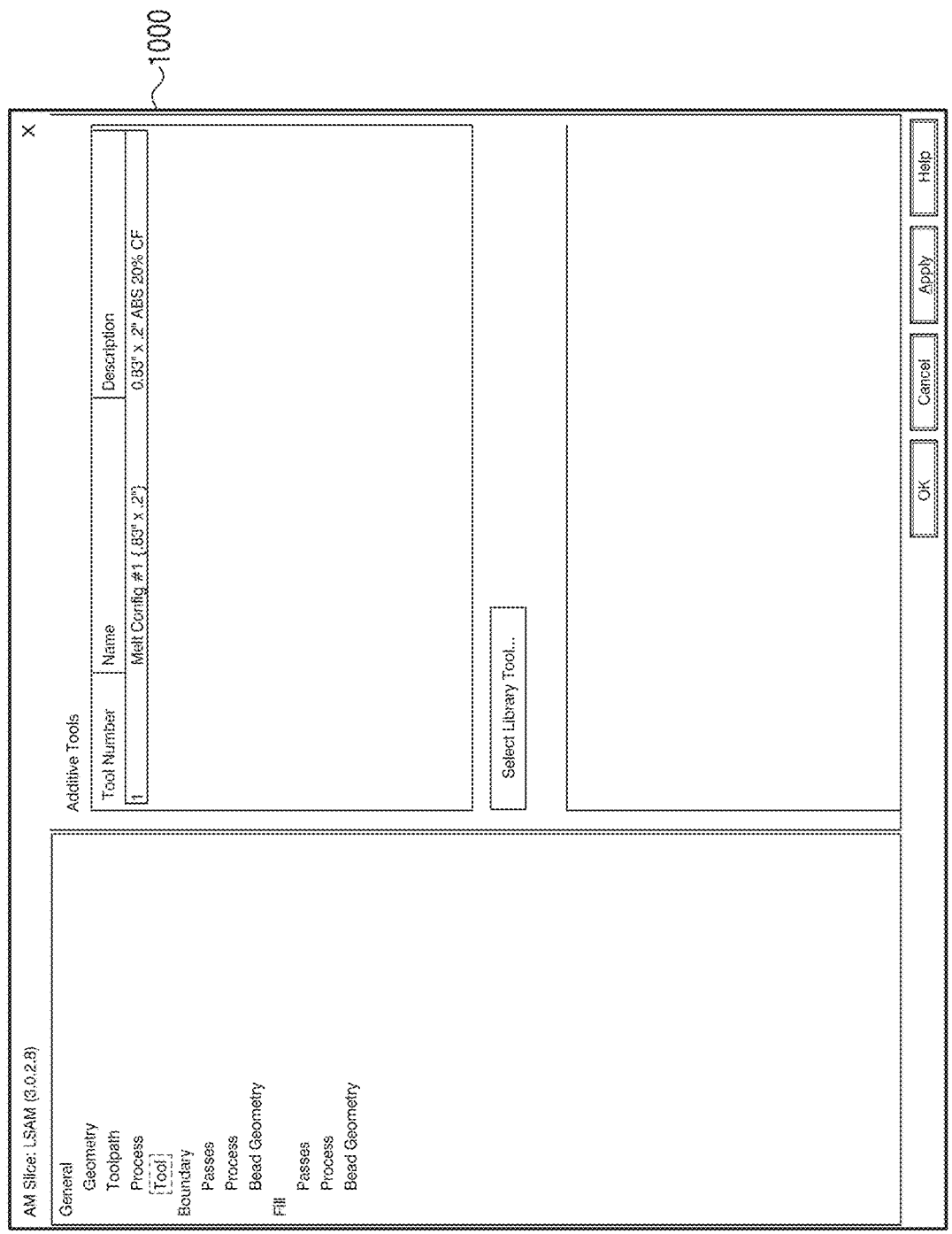
FIG. 10 is an exemplary screen shot of a graphical user interface prompting input of print parameters of the tool subcategory of the general category.

FIG. 10 depicts a user interface 1000 that allows the user to input values or otherwise specify the print parameters included in the tool subcategory under the general category. The tool subcategory may represent the melt configuration corresponding to the tool used in the printing process. For example, a melt configuration number 1 may correspond to a tool number 1, where melt configuration 1 is described as using a print material comprising 20% carbon fiber filled ABS, a print bead width of 0.83 inches and a print bead thickness of 0.20 inches.

Figure 11:
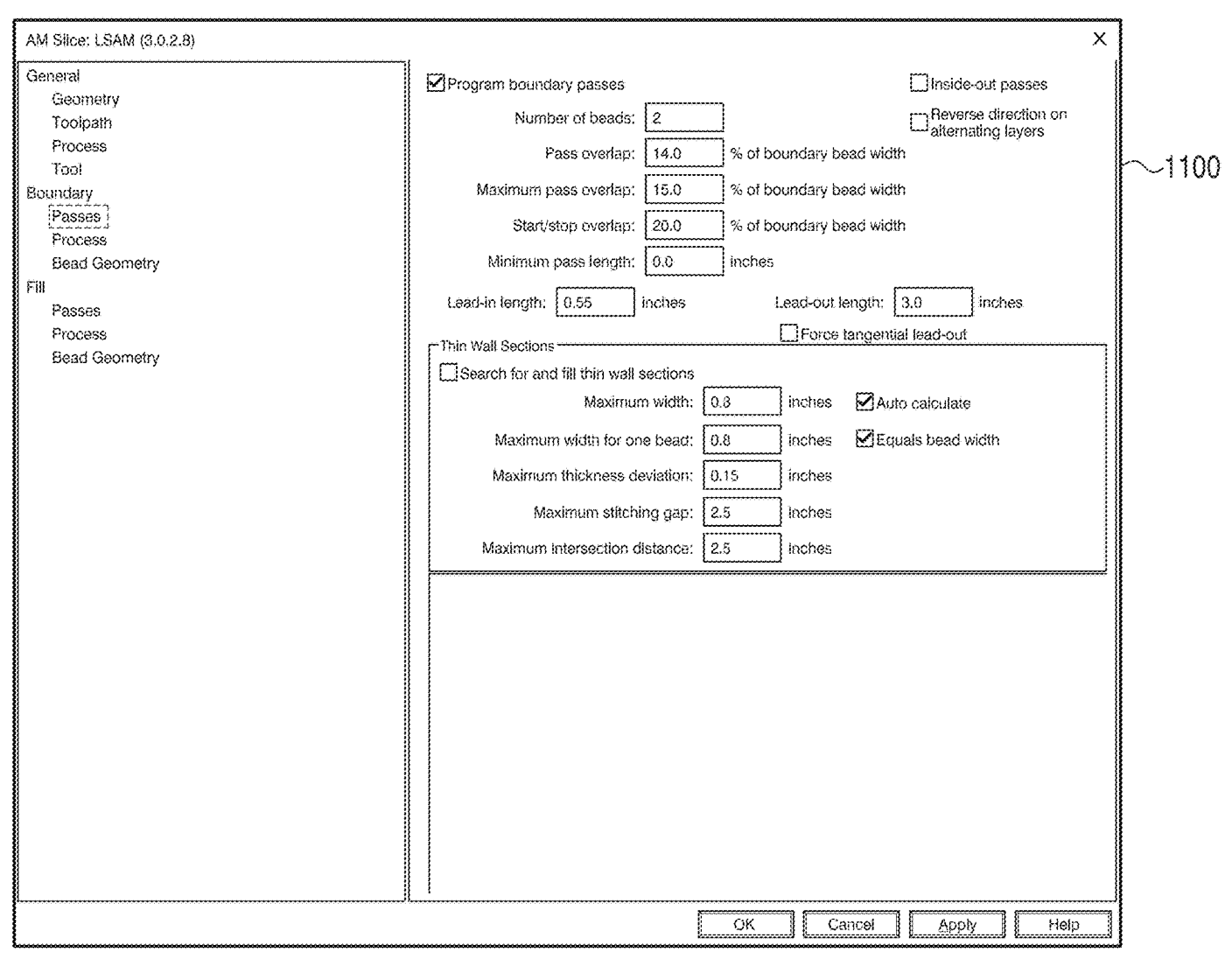

FIG. 11 depicts a user interface 1100 that allows the user to input, select, or otherwise specify the values of the print parameters included in the passes subcategory under the boundary category. The passes subcategory may include print parameters or sets of print parameters such as, e.g., a program boundary passes parameter, an inside-out passes parameter, a reverse direction on alternating layers parameter, a number of beads parameter, a pass overlap parameter, a maximum pass overlap parameter, a start/stop overlap parameter, a minimum pass length parameter, a lead-in length parameter, a lead-out length parameter, a force tangential lead-out parameter, and a thin wall sections parameter. The program boundary passes parameter refers a selection of whether or not the toolpath includes boundary passes. The inside-out passes parameter is a selection of whether or not the toolpath starts with an inner-most pass, determined with respect to the layer outline, and progress outwards towards the layer outline. The reverse direction on alternating layers parameter is a selection of whether or not the toolpath reverses direction for every other layer.

The number of beads parameter represents the number of toolpath passes to made by the applicator head 43 along each boundary of the layer outline. The pass overlap parameter specifies a value of the lowest percentage of overlap between adjacent beads (measured as a percentage of the bead width). The maximum pass overlap parameter refers to a maximum distance (measured as a percentage of the bead width) that adjacent print beads will overlap one another. The start/stop overlap parameter is a value corresponding to the percentage of overlap between the beginning and ending of the bead on boundary passes (measured as a percentage of bead width). The lead-in length parameter is a distance that the bead will be deposited along a layer before starting to deposit each boundary pass. The lead-out length parameter is a distance the bead will be deposited measured from the end of each boundary pass. The force tangential lead-out print parameter is a selection determining whether the bead moves tangentially to the toolpath upon completing the toolpath. The thin wall sections set of print parameters may include a maximum width parameter, a search for and fill thin wall sections parameter, a maximum width for one bead parameter, a maximum thickness deviation parameter, a maximum stitching gap parameter, a maximum intersection distance parameter, an auto calculate parameter, and an equals bead width parameter. As defined herein, a thin wall is a portion of a layer of the section or part being printing between two boundaries positioned close to one another. In other words, the two boundaries form a thin wall between them. The set of thin wall sections set of print parameters may be used to identify a thin wall area in a section or section and if and/or how such an area should be filled.

Figure 12:
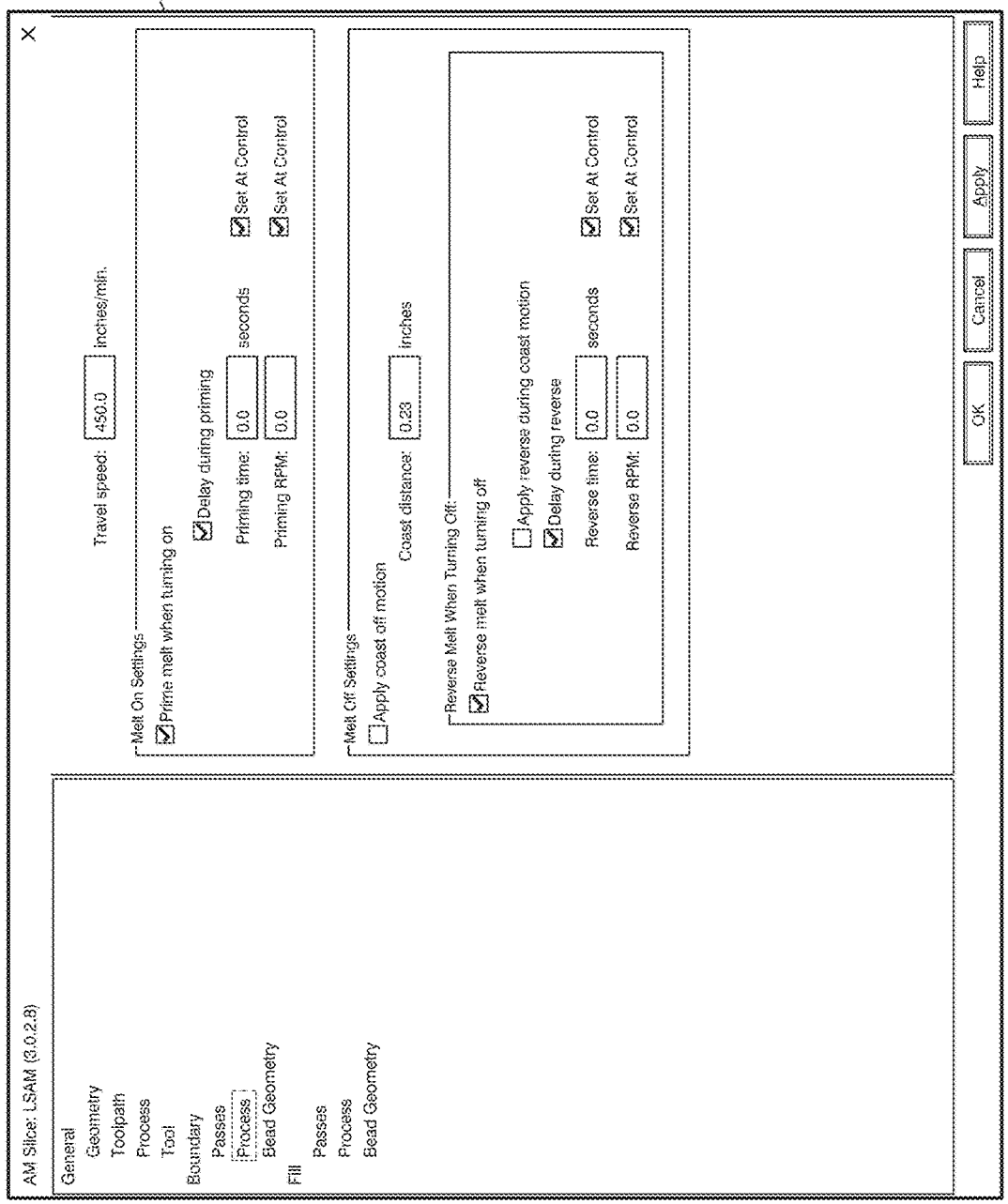
FIG. 12 is an exemplary screen shot of a graphical user interface prompting input of print parameters of a process subcategory of a boundary category.

FIG. 12 depicts a user interface 1200 that allows the user to input values or otherwise specify print parameters included in the process subcategory under the boundary category. In some examples the process subcategory for the fill category include the same print parameters as the boundary category. The print parameters of the process subcategory may include a travel speed parameter, a melt on settings set of print parameters, and a melt off settings set of print parameters. The travel speed parameter is a maximum feed rate of the flowable material through the applicator head as it deposits material. The melt on settings set of print parameters may include a prime melt when turning on parameter, a delay during priming parameter, a prime time parameter, and a priming RPM parameter. The prime melt when turning on parameter is a selection of whether or not the priming process is executed before depositing each bead. The delay during priming parameter is a selection of whether or not the bead may be deposited along the toolpath during the priming process. The priming time parameter is period of time for which the priming process may be executed. The priming RPM parameter is a speed, measured in revolutions per minute, at which the extruder 61 rotates the extruder screw during the priming process.

The melt off settings set of print parameters may include an apply coast off motion parameter, a coast distance parameter, a reverse melt when turning off parameter, an apply reverse during coast motion parameter, a delay during reverse parameter, a reverse time parameter, and a reverse RPM parameter. The melt off settings set of parameters control the extrusion and/or deposition of material during a "coast process" executed at the end of printing each bead. The apply coast off motion parameter is a selection of whether or not the extruder continues to melt the material while the applicator head 43 moves through distance specified by the coast distance parameter. The coast distance parameter a distance, measured from the end of each bead, that the applicator head 43 moves while executing the coast process. The reverse melt when turning off parameter is a selection of whether or not the to reverse the flow of material during the coasting process. The flow of material may be reversed while the applicator head 43 moves through the coast distance, or while the applicator head 43 stays in place. In some examples, the flow may be reversed by rotating the extruder screw and/or the gear pump 62 in a direction opposite to the direction of rotation for printing. Reversing the flow of material may, in some embodiments, pull material into one or more parts of CNC machine 1, e.g., the extruder 61 or the applicator head 43.

The apply reverse during coast motion parameter is a selection that controls whether the reversal of the flow of the material is reversed while the applicator head 43 moves through the coast distance. The delay during reverse parameter is a selection determining whether the reversal of the flow of the material is time bound by the reverse time parameter. The reverse time parameter is a period of time that the flow is reversed during the coasting process. The reverse RPM parameter is a speed (measured in revolutions per minute) that the extruder screw is rotated when the flow of the material is reversed. The set at control parameter is a selection of whether or not the priming time parameter, the priming RPM parameter, the reverse time parameter, or the reverse RPM parameter may be overridden by the slicing process and replaced with values received via command codes determined by the controller 100.

Figure 13:
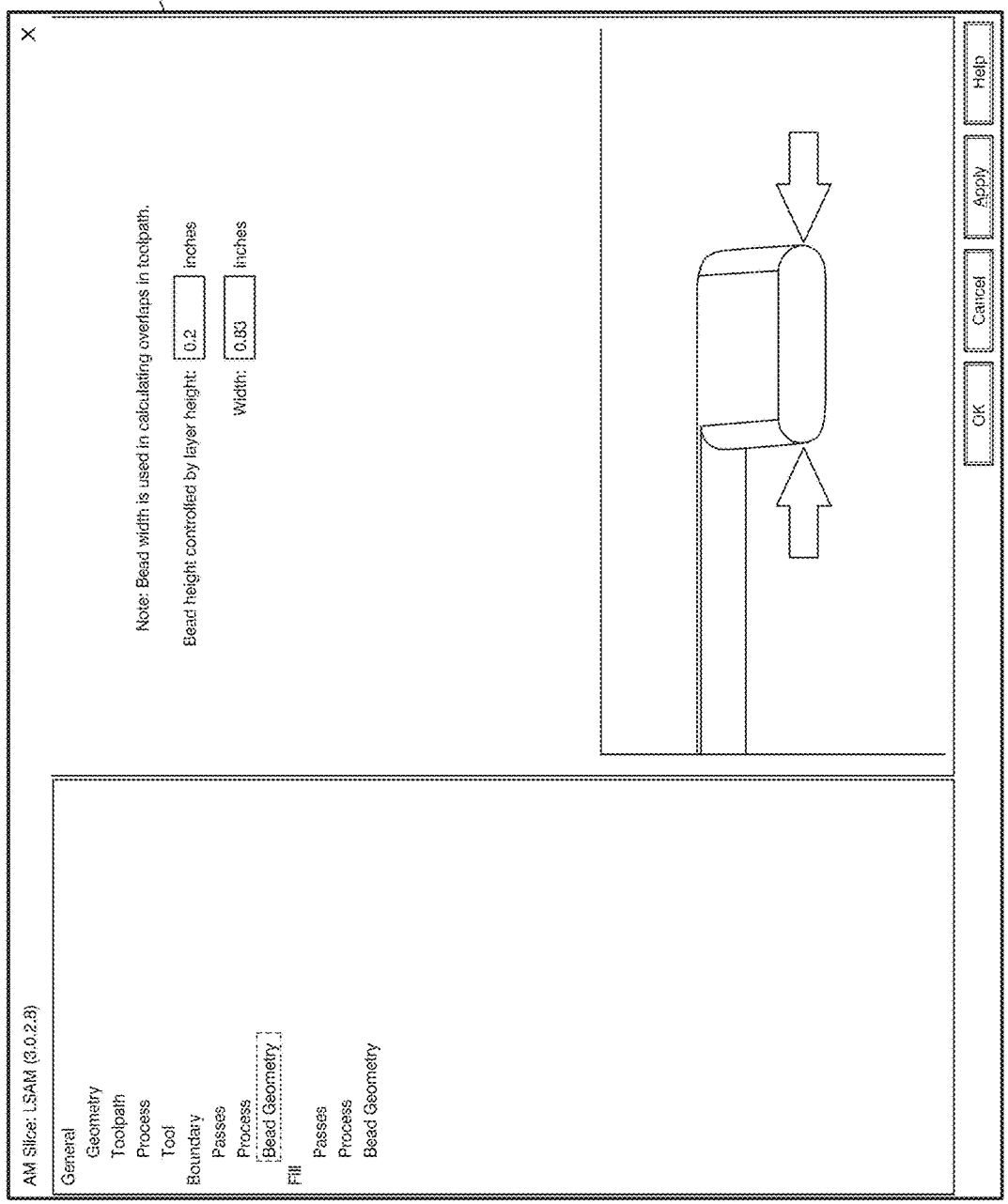
FIG. 13 is an exemplary screen shot of a graphical user interface prompting input of print parameters of a bead geometry subcategory of the boundary category.

FIG. 13 depicts a user interface 1300 that allows the user to input values or otherwise specify the print parameters included in the bead geometry subcategory under the boundary category. In some examples, the bead geometry subcategory under the fill category may include the same print parameters as the geometry subcategory of the boundary category. The parameters listed on this subcategory may include a bead height controlled by layer height parameter and a width parameter.

The bead height controlled by layer height parameter is a thickness of each bead being deposited to form each layer of the section or part. The bead height controlled by layer height parameter may be determined based in part on the layer height parameter of the toolpath subcategory of the general category. The width parameter is a measurement of a width of the bead to be deposited. The width parameter may be used to generate the toolpath and/or simulate the printing process. As mentioned above, one or more of the print parameters may be determined based in part on the value of the width parameter.

Figure 14:
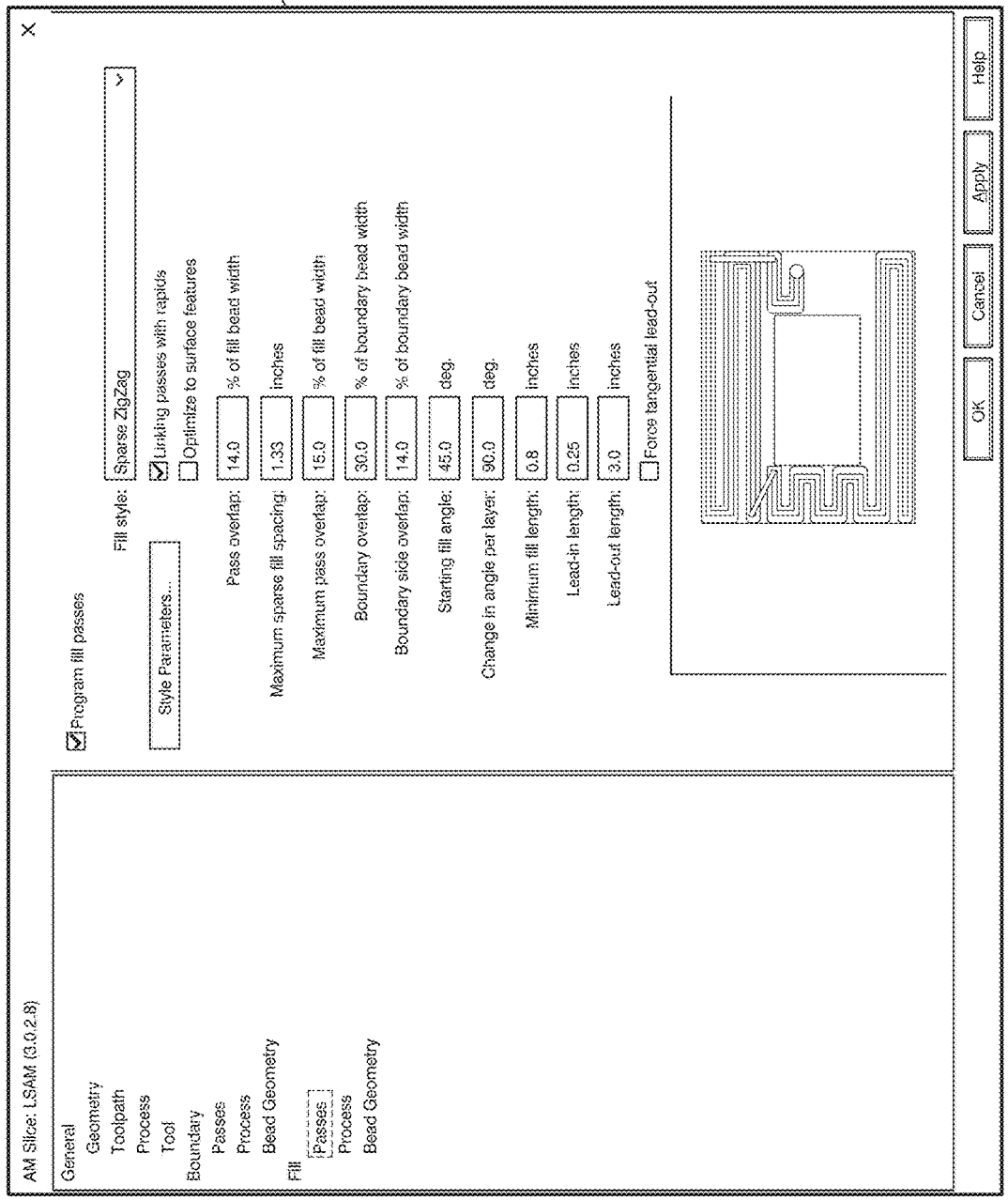
FIG. 14 is an exemplary screen shot of a graphical user interface prompting input of print parameters of the passes subcategory of a fill category.

FIG. 14 depicts a user interface that allows the user to input values or otherwise specify the print parameters included in the passes subcategory under the fill category. The passes subcategory may include print parameters such as, e.g., a program fill passes parameter, a fill style parameter, a linking passes with rapids parameter, an optimize to surface features parameter, a pass overlap parameter, a maximum sparse fill spacing parameter, a maximum pass overlap parameter, a boundary overlap parameter, a boundary side overlap parameter, a starting fill angle parameter, a change in angle per layer parameter, a minimum fill length parameter, a lead-in length parameter, a lead-out length parameter. The program fill passes print parameter is a value indicating a selection of whether or not the toolpath will be determined with a fill. The fill style parameter is a selection of the method of determining the toolpath for the fill. Exemplary fill styles include a simple zigzag style, a smart zigzag style, a smart zigzag constant overlap style, a variable bead regions style, a sparse zigzag style. These exemplary fill styles are illustrated in FIGS. 15 through 19, which will now be described.

Figure 15:
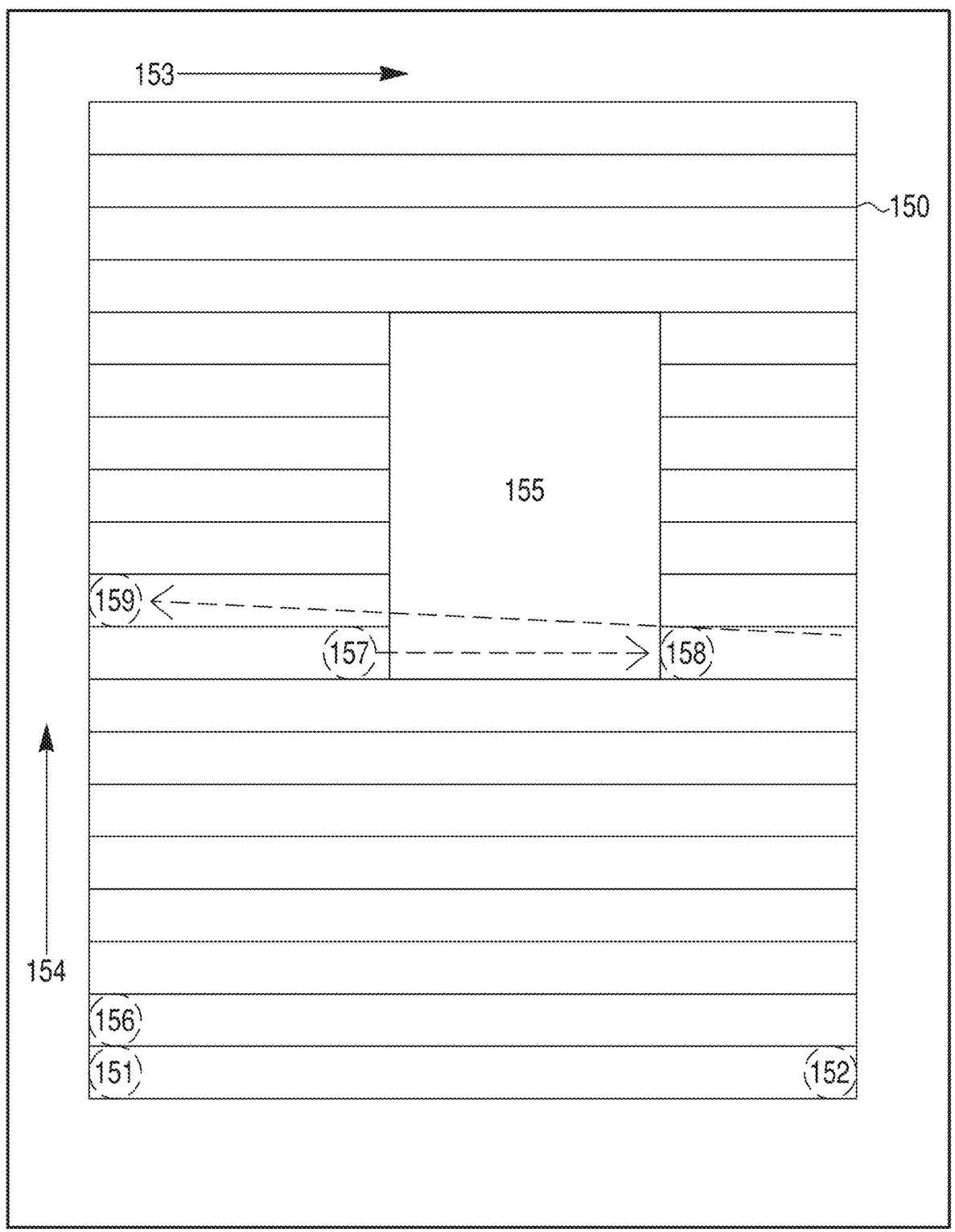
FIG. 15 is a top view diagram of an exemplary fill path generated using a one-way fill style.

FIG. 15 depicts a top view diagram of the toolpath of a layer 150 produced using the one way fill style. The one way fill style may produce a toolpath having lines all oriented along the same direction. The toolpath begins by depositing a bead in a first pass starting at a first point 151 moving along a first vector 153 toward a second point 152. Upon reaching point 152, the applicator head 43 stops depositing the bead, and moves to a third point 156 adjacent to the start of the first pass, at first point 151. The bead then deposits a second pass from the third point, the second pass extending along the first vector 153 adjacent to the first pass. These steps are repeated to deposit additional passes, each subsequent pass being depositing along the first vector 153 adjacent to the preceding pass. Accordingly, a width of each pass of the toolpath increases a width of the layer 150 along a second vector 154. If the applicator head 43 encounters a hole 155 in layer 150, e.g., at point 157, the applicator head 43 stops printing the bead and moves to a position across the hole 155 opposite of point 157, point 158. The applicator head 43 then continues to deposit the printing bead along the first vector 153. Once the pass containing points 157 and 158 is completed, the applicator head 43 moves to a position 159 adjacent the start of the pass that contains points 157 and 158. The applicator head 43 continues to deposit the printing bead in this manner until the layer 150 is complete.

Figure 16:
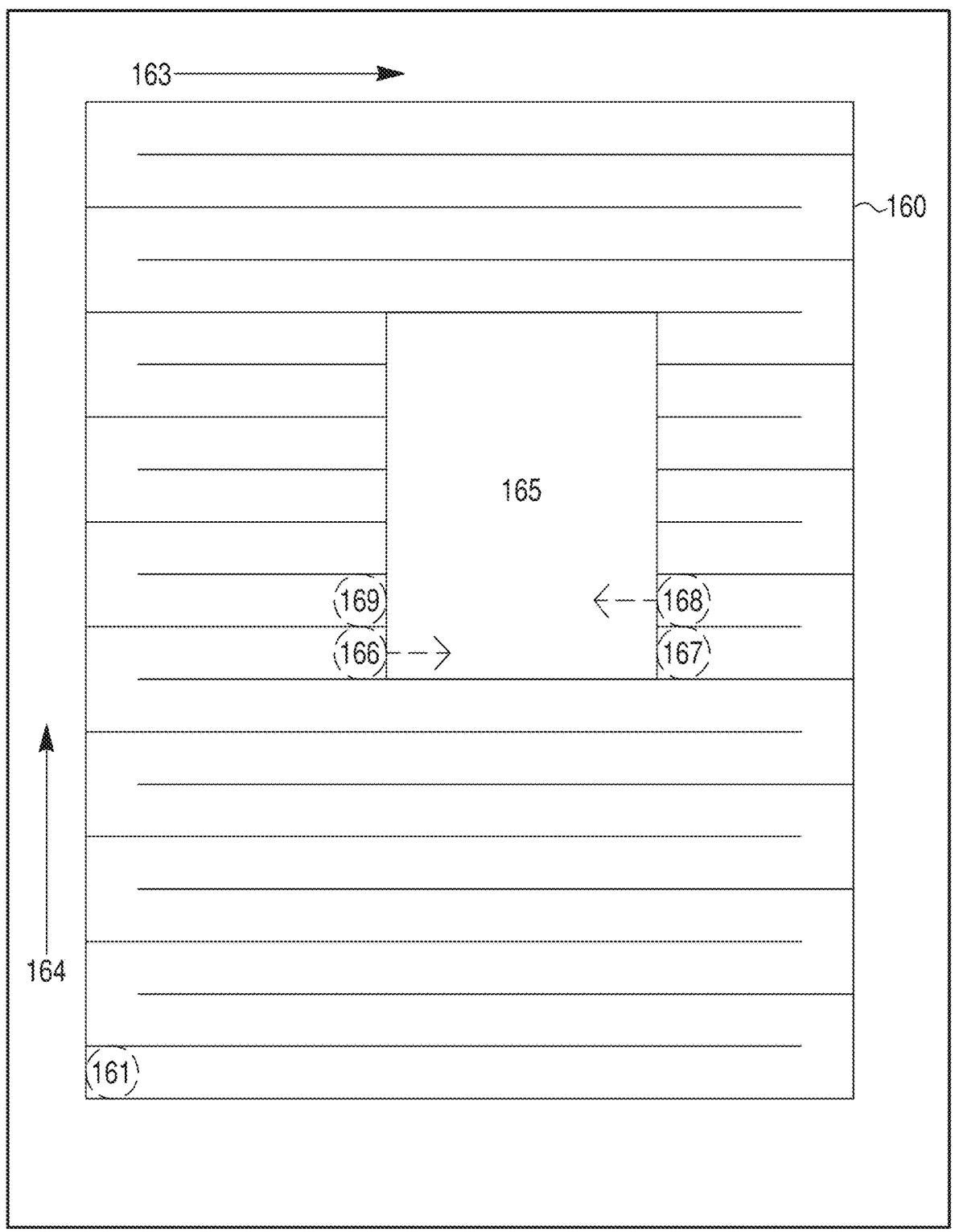
FIG. 16 is a top view diagram of an exemplary fill path generated using a simple zigzag fill style.

FIG. 16 depicts a top view diagram of the toolpath of a layer 160 generated using the simple zigzag fill style prints. The simple zigzag fill style may produce a toolpath that serpentines along the layer to fill the layer. For example, the toolpath may begin a first pass at a first point 161 and extend along a first vector 163. Upon reaching a boundary of the layer 160, the first pass may be completed, but the bead may still be deposited as the applicator head 43 moves along a second vector 164 a distance equal to the width of the bead being deposited along the tool path. The toolpath then begins a second pass, guiding the applicator head 43 in a direction opposite the first vector 163 till it reaches another boundary of the layer. By these steps, the bead is deposited in a serpentine manner in which each subsequent pass extends adjacent to the preceding pass in a direction opposite the preceding pass. If the toolpath encounters a hole 165 in the layer 160, e.g., at a second point 166, the applicator head 43 stops depositing the bead and continues to follow the current pass direction over the hole till the applicator head 43 has completely passed over the hole, e.g., at a third point 167. The applicator head 43 then begins depositing the bead of material from the third point 167 in the same manner as the previous passes. The steps of stopping the printing of the bead and moving over the hole 165 may be repeated for any additional points where the toolpath intersects the hole 165, e.g., from a fourth point 168 to a fifth point 169.

Figure 17:
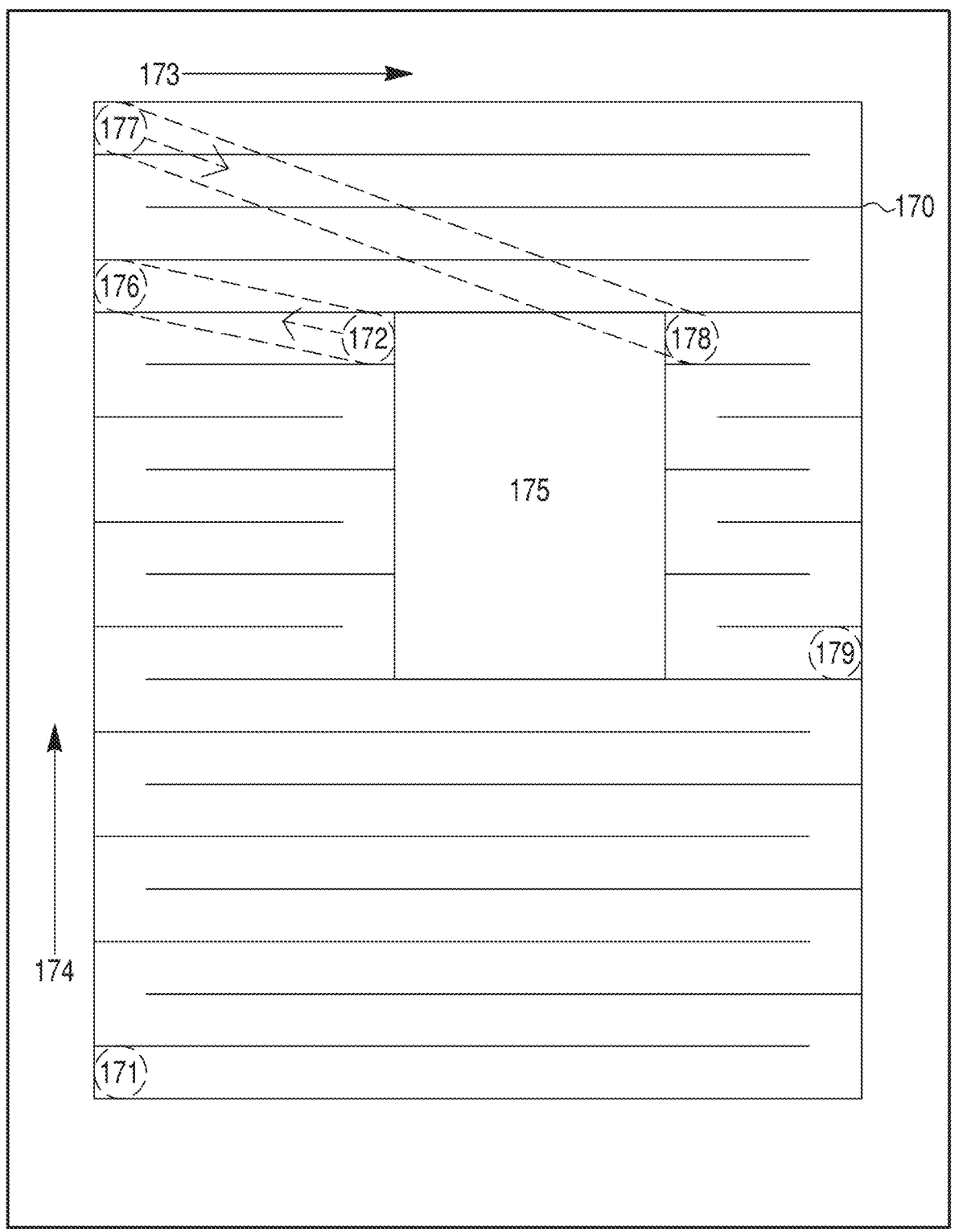
FIG. 17 is a top view diagram of an exemplary fill path generated using a smart zigzag fill style.

FIG. 17 depicts a top view diagram of the toolpath of a layer 170 generated using the smart zigzag fill style. The toolpath generated using the smart zigzag fill style is generated in a manner similar to the simple zig zag fill style. For example, a first pass may begin at a first point 171 and extend along a first vector 173. The toolpath may serpentine through the layer 170 along a second vector 174 while continuously depositing material. Using the smart zigzag fill style, if the toolpath intersects a hole 175 the applicator head 43 will continue to serpentine along the second vector 174 without passing over the hole 175 until the toolpath reaches a second point 172, where the toolpath intersects the hole 175 along the pass furthest along the second vector 174. At the second point 172, the applicator head 43 may stop depositing material and move to a third point 176 adjacent to the start of the most recent pass that intersected the hole 175. After reaching an end point of the layer 170 along the second vector 174, e.g., at a fourth point 177, the applicator head 43 stops depositing material and moves to a point along the last path that intersected the hole 175. This fifth point 178 is opposite the second point 172. From the fifth point 178, the toolpath may serpentine between the hole 175 and the outline of the layer 170 in a direction opposite to the direction of the second vector 174. The toolpath continues until it reaches a sixth point 179 where the next would intersect a previously deposited pass.

Figure 18:
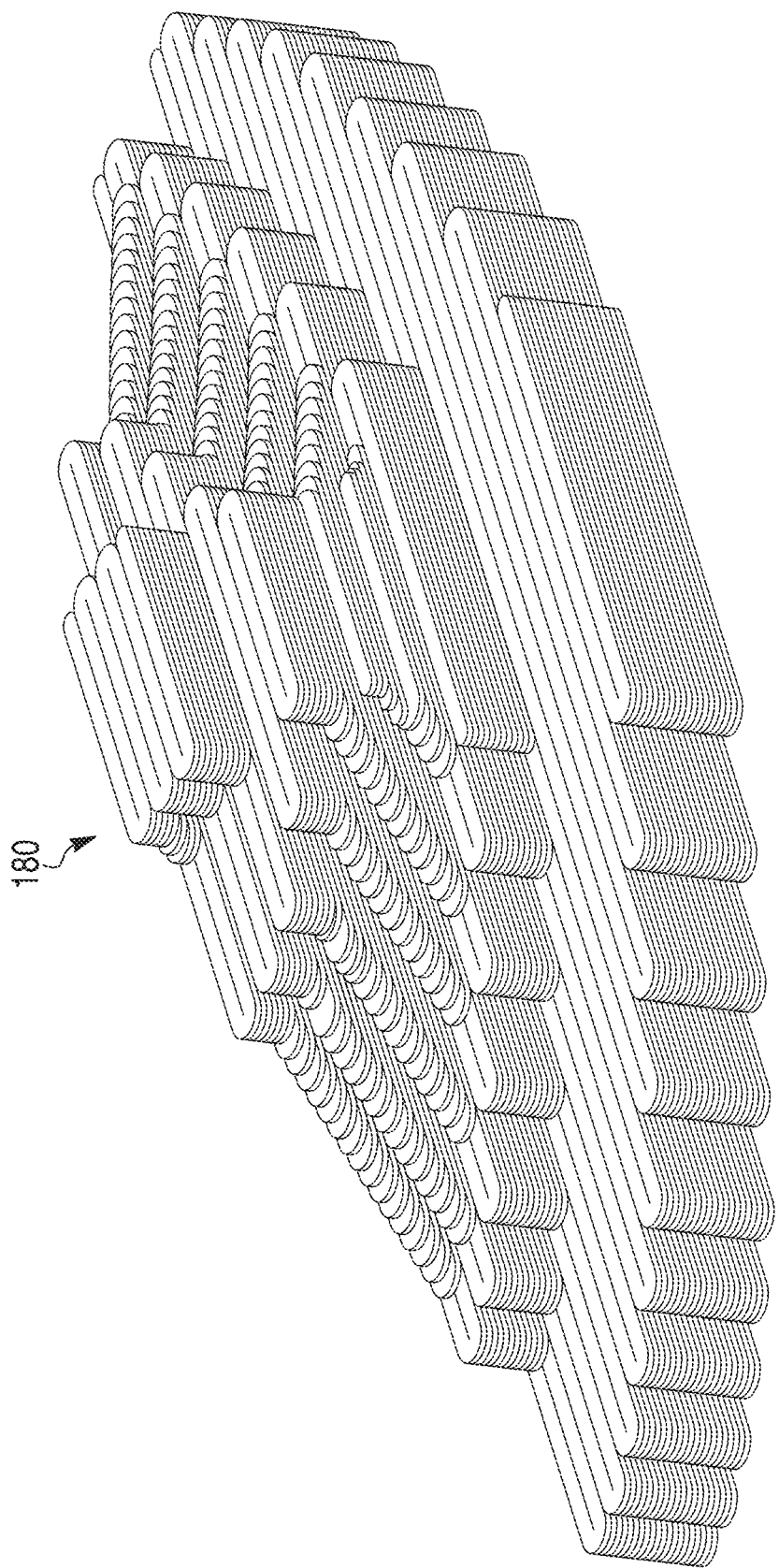
FIG. 18 is a top view diagram of an exemplary fill path generated using a smart zigzag constant overlap fill style.

FIG. 18 illustrates a part 180 manufactured using the constant overlap fill style. The constant overlap fill style produces a toolpath in the same general manner as the smart zigzag fill style. However the constant overlap fill style creates a toolpath having a constant percentage, measured with respect to the bead of material, of overlap between passes of the toolpath. In some examples, sections or parts, e.g., sections or parts without a cavity or hole therein, may be printed with a toolpath limited to the fill of the part. In further examples, sections or parts may be printed from toolpaths absent boundary beads.

Figure 19:
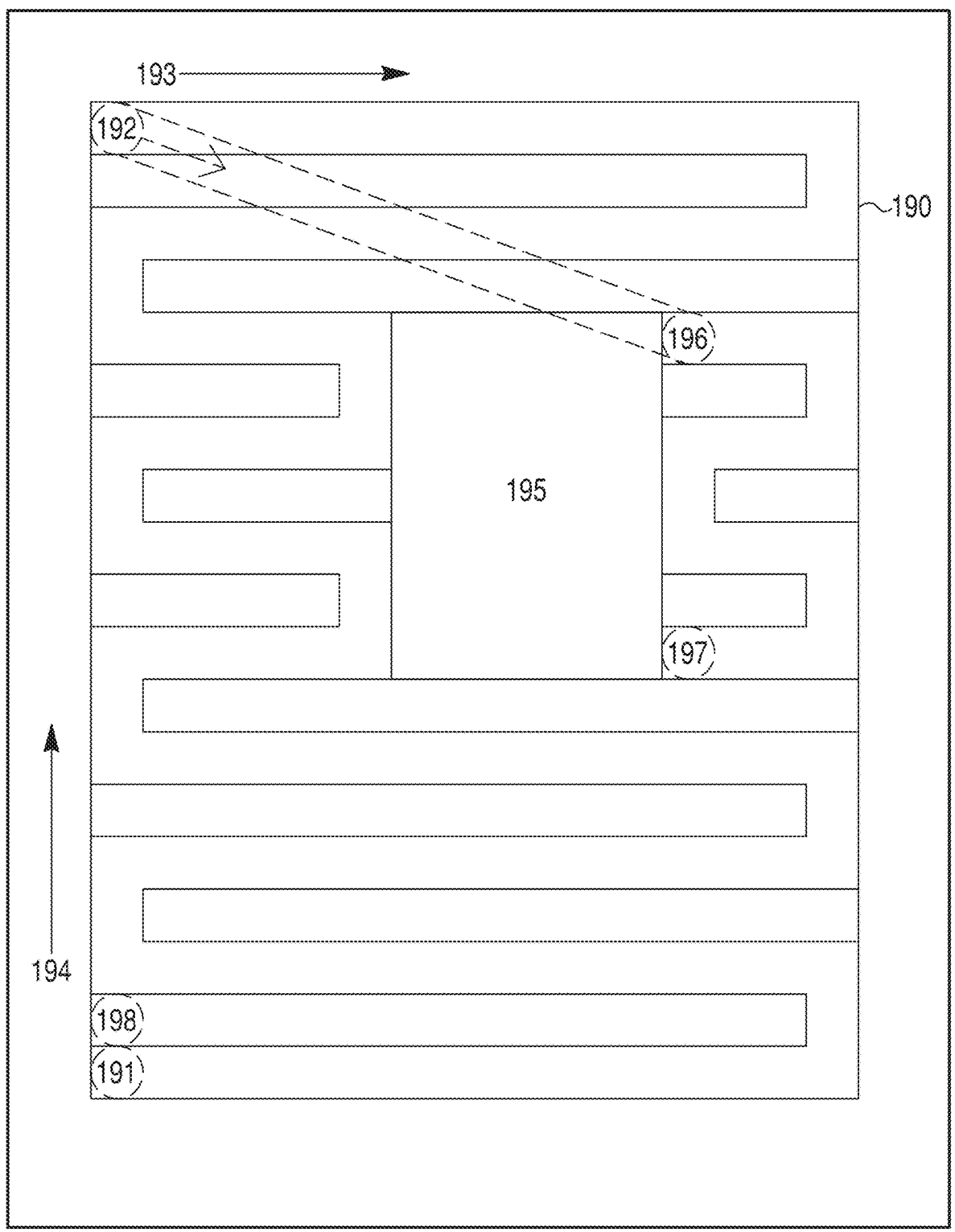
FIG. 19 is a top view diagram of an exemplary fill path generated using a sparse zigzag fill style.

FIG. 19, illustrates a top view diagram of the toolpath of a layer 190 generated using the sparse zigzag fill type. Under the sparse zigzag fill type, a first pass may begin at a first point 191 and extend along a first vector 193. The toolpath may serpentine across the layer 190 in the direction of a second vector 194. As shown, the serpentine shape of the toolpath may leave a space between curves of the toolpath. If the toolpath intersects a hole 195 the toolpath will continue to serpentine along the second vector 194 between the hole 195 and a boundary of the layer. The toolpath continues along the layer in the direction of the second vector 194 until reaching an second point 192. Upon reaching the second point 192, the toolpath may instruct the applicator head 43 to stop depositing material and move to a space on the layer that has not yet been filled, e.g., a third point 196. The toolpath may include directions to deposit material from the third point 196 and move the applicator head 43 in along a direction opposite the second vector in a serpentine manner till the toolpath reaches a fourth point 197. The fourth point 197 may be a position adjacent to a bead of material that has already been deposited along the toolpath. The toolpath may further include one or more passes along any spaces or gaps between the curves of the toolpath, e.g., a pass beginning at a fifth point 198.

The variable bead regions fill style (not shown) may include determining a toolpath in a similar fashion to the smart zigzag tool type, the toolpath being altered to include an extra pass to fill any voids detected between the bead of the fill and a boundary of the layer.

With reference again to FIG. 14, the linking passes with rapids parameter a selection that determines whether the material is still melted, e.g., by operating the extruder 61, when the applicator head 43 moves from one fill line or pass to the next. Optimize to surface features is a selection of whether or not the toolpath is generated weighing accuracy of adhering to the contours of the part over reducing overlap between beads. The pass overlap parameter is a minimum percentage that the bead being deposited will overlap adjacent beads that have already been deposited as determined as a percentage of the width of the bead of the boundary. The maximum sparse fill spacing parameter is a maximum distance allowed between a center of one bead to the center of the adjacent bead when using the sparse zigzag fill style. The maximum pass overlap parameter is a maximum allowed percentage, measured with respect to the width of bead of the fill, that the bead can overlap adjacent beads. The boundary overlap parameter is a percentage, measured with respect to the bead width of the boundary, that each bead of the fill near the periphery of the layer may overlap the boundary beads of the layer. The value of the boundary overlap parameter may be input as a percentage of the width of the bead of the boundary. The boundary side overlap parameter is a percentage measured with respect to the bead width of the boundary, that each bead of the fill that contacts the boundary will overlap the bead of the boundary. The starting fill angle parameter is an angle of the initial fill layer. The change in angle per layer parameter is angle the subsequent fill layer will be printed on with respect to the previous fill layer. The minimum fill length parameter is a minimum distance the toolpath must extend to be included as a fill pass. The lead-in length parameter is a distance used to approach the start of each fill pass. The lead-out length print parameter is a distance that the bead of the fill is deposited extending from the end of each fill pass along the toolpath. The force tangential lead-out is a distance the bead of the fill will extend tangentially from the last point in the toolpath.

Figure 20:
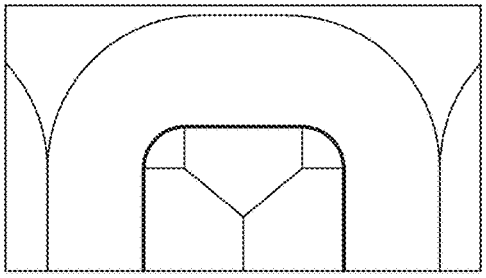
FIG. 20 is an exemplary screen shot of a graphical user interface for the input of fill style parameters.

FIG. 20 depicts a user interface 200 that allows the user to input values or otherwise specify the print parameters included in the fill style print parameters subcategory. The parameters listed on the fill style print parameters subcategory may include a fillet radius on path corners parameter, a melt output reduction in corners parameter, a travel speed on corners parameter, a max end overlap distance parameter, a max side overlap distance parameter, a place fill turns outside section boundary parameter, a limit to fill line matching parameter, a fill line extension before turn set of parameters, a step tolerance parameter, and an angle tolerance parameter. The fillet radius on path corners parameter is a percentage of a radius of the bead at each corner of toolpath within the fill. The melt output reduction in corners parameter is a percentage of reduction of material being output in corners. The travel speed on corners parameter is a speed the nozzle 51 travels in the corners which can be made to match the fill pass speed by checking the parameter same as fill passes travel speed. The max end overlap distance parameter is a maximum distance the end of a fill bead can cross into a boundary bead and is used in conjunction with boundary overlap. The max side overlap distance parameter is a maximum distance the side of a fill bead can cross into a boundary bead and is used in conjunction with boundary side overlap. The place fill turns outside part boundary parameter is a selection to determine whether the toolpath line extends beyond the fill boundary at turns of the toolpath. When no boundary passes are included, if the two fill lines involved in a bridge do not form a perpendicular bridge, the shorter fill line is extended to be even with the longer fill line. If the difference in the two fill line end points is greater than the limit to fill matching value, the shorter fill line will not be extended and no bridge will be formed.

With continued reference to FIG. 20, the fill line extension before turn option allows the ends of each fill pass to be extended by a distance beyond the part boundary. The step tolerance parameter is a distance that is referenced for scale when determining the fill of small entities at a top and a bottom of a fill surface. The angle tolerance parameter is an angle indicative of the margin of error in creating a flat surface, e.g., the top surface and bottom surface of the fill surface.

Figure 21:
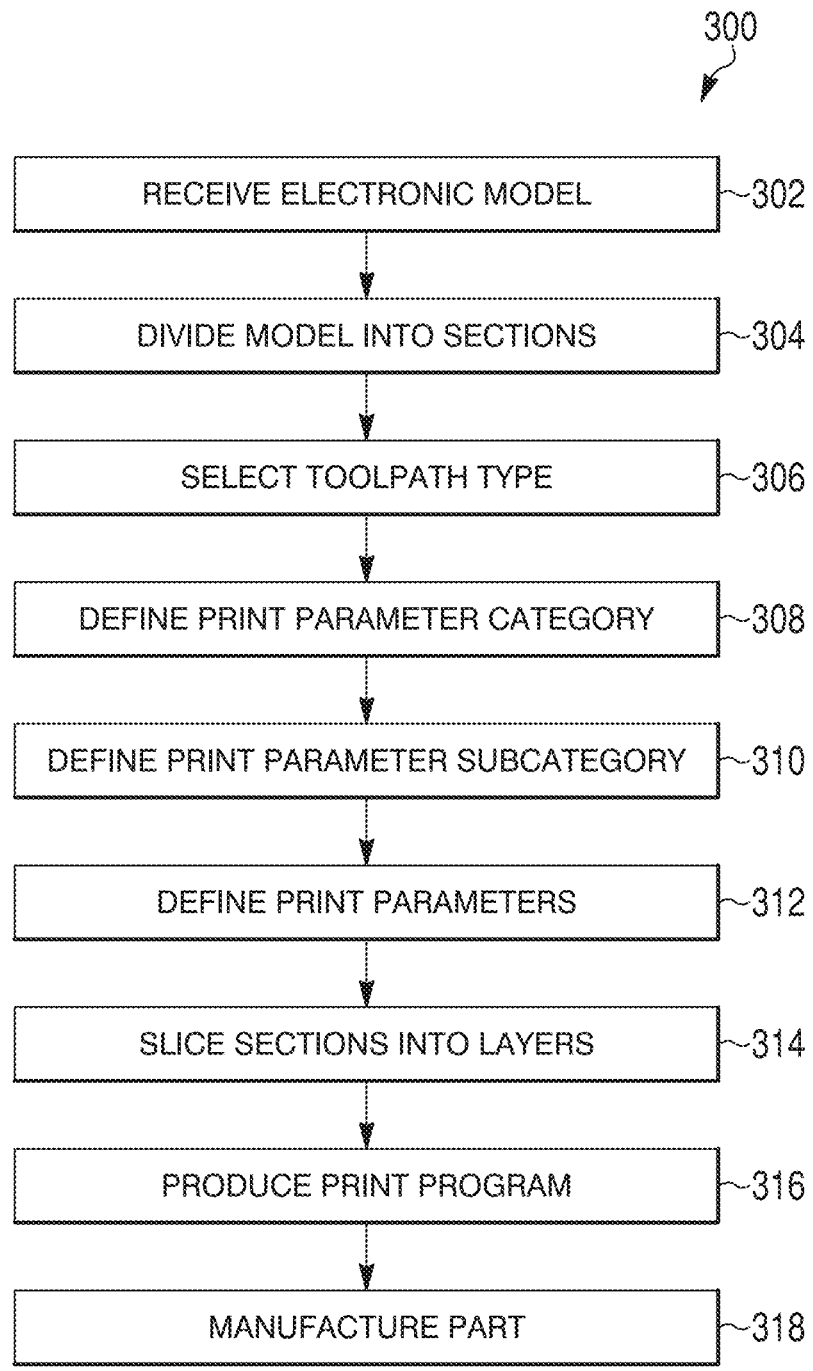
FIG. 21 is a flowchart of a method of executing the slicing process and manufacturing a part.

Based in part on one or more of the foregoing print parameters, the slicing process may divide an electronic model(s), e.g., a CAD model, of the part to be printed into a number of sections, each section having one or more layers, and each layer having a distinct toolpath and print parameters. The slicing process may produce a print program or process based in part on the sections and/or layers. The print program may be transmitted to CNC machine 1 to manufacture the part. FIG. 21 shows an exemplary flow diagram of a method 300 of executing the slicing process and manufacturing a part. The slicing process may include receiving an electronic model, such as, e.g., a CAD model, at an electronic device (e.g., at controller 100) at a step 302. Next, at a step 304, the model may be divided into a number of sections. Before slicing each section into layers, the parameters for printing those layers may be input, selected, adjusted, or otherwise specified by a user and/or retrieved from memory by the slicing process. To begin defining the parameters of each section, a toolpath type may be selected at a step 306. Next, at a step 308, a category of print parameters may be defined. Then, a subcategory of print parameters may be defined at a step 310. At step 312, one or more print parameters for the section may be defined. Steps 308, 310, and 312 may be repeated as desired to define print parameters under different categories or subcategories and/or print parameters of different sections. At step 314, the slicing process may slice or divide the sections into a number of layers. At step 316, the slicing program may produce a printing program or process to be executed at the CNC machine 1. The printing program may include some or all of the layers and sections of the part to be manufactured. Then, at step 318, the slicing process may initiate manufacturing of the part. The method 300 shown in FIG. 21 is only exemplary. Some of all of the steps of method 300 may be completed. Additionally or alternatively, the steps of method 300 may be executed in a different sequence.

The printing process to manufacture the part produced by the slicing process may print a first layer of a first section in a manner such that the first layer overlaps, contacts, and/or meshes with a first layer of a second section. In some examples, the separate sections of the manufactured part may be printed by the CNC machine 1 so that the sections meld, join, or otherwise attach to one another. That is, in contrast to the formation of separate portions which are subsequently assembled to form a part, the methods described herein permit each of the separate sections of a part to be printed in a single printing process to form the part.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. An additive manufacturing method, comprising:
   receiving, at an electronic device, a computer aided design (CAD) model of a part;
   dividing the CAD model into a first section and a second section;
   selecting a first set of print parameters for the first section and a second set of print parameters for the second section, wherein the first set of print parameters includes one or more parameters that are different from the second set of print parameters;
   slicing the first section and the second section into a plurality of layers, wherein the first section is sliced into a number of layers that is based on one or more print parameters of the first set of print parameters selected based on an interaction with one or more graphical elements presented to a user, and the second section is sliced into a number of layers that is based on one or more print parameters of the second set of print parameters selected based on an interaction with one or more graphical elements presented to a user; and
   generating a print program for depositing a flowable material onto a surface according to the first set of print parameters and the second set of print parameters to manufacture the part, the flowable material including a first layer of the first section that fuses with a first layer of the second section.

2. The additive manufacturing method of claim 1, wherein the print program, when executed by an additive manufacturing apparatus, causes the additive manufacturing apparatus to deposit the flowable material to form the first section with a lower most layer positioned at a height above a worktable.

3. The additive manufacturing method of claim 1, wherein the first set of print parameters includes:
   an accuracy with which a toolpath follows a corresponding contour of the part, a slice plane, a layer spacing, a bead height, or a bead width.

4. The additive manufacturing method of claim 1, wherein the first set of print parameters includes a layer spacing that defines a thickness of each layer to be produced by the slicing.

5. The additive manufacturing method of claim 1, including depositing the flowable material by printing the first layer of the first section and the first layer of the second section such that the first layer of the first section and the first layer of the second section are in contact with each other and fuse together.

6. The additive manufacturing method of claim 1, wherein the slicing is performed based on a layer height parameter or a number of layers parameter selected according to an interaction with one or more graphical elements.

7. An additive manufacturing method, comprising:
   receiving, at an electronic device, a model of a part;
   dividing the model into a first section and a second section;
   selecting, based on an interaction with one or more graphical elements presented to a user, a first set of print parameters for the first section, including one or more of:
     an accuracy with which a toolpath follows a corresponding contour of the part, a height limit, a slice plane, a layer spacing, a number of layers printed on a top layer of the part, a gear pump speed reduction, a void detection, a corner pull-back, an amount of adjacent bead overlap, a priming process, a coast process, or a bead width;
   selecting, based on an interaction with one or more graphical elements presented to a user, a second set of print parameters for the second section, including one or more of:
     the accuracy with which a toolpath follows a corresponding contour of the part, the height limit, the slice plane, the layer spacing, the number of layers printed on the top layer of the part, the gear pump speed reduction, the void detection, the corner pull-back, the amount of adjacent bead overlap, the priming process, the coast process, or the bead width;
   slicing the first section into a first number of layers and slicing the second section into a second number of layers; and
   generating a print program for depositing a flowable material onto a surface according to the first set of print parameters and the second set of print parameters.

8. The additive manufacturing method of claim 7, wherein the first section and the second section are adjacent to each other in a vertical direction.

9. The additive manufacturing method of claim 7, wherein the print program, when executed by an additive manufacturing apparatus, causes the additive manufacturing apparatus to deposit the flowable material to form the first section with a lower most layer positioned at a height above a worktable.

10. The additive manufacturing method of claim 7, wherein the first set of print parameters further includes one or more of: a layer spacing that defines a thickness of each layer to be produced by the slicing, a fill for any voids detected during an analysis of the part, a pull-back for removing excess material, a parameter for reversing direction on alternating layers, or a flow reversal for rotating an extruder screw or a gear pump in a reverse direction.

11. The additive manufacturing method of claim 7, wherein the slicing is performed based on a layer height parameter selected according to an interaction with one or more graphical elements.

12. The additive manufacturing method of claim 7, further including operating an additive manufacturing apparatus based on the print program and the first set of print parameters, wherein the first set of print parameters includes the bead height or the bead width.

13. An additive manufacturing system, comprising:
   a computing device including a memory and a processor, wherein the processor is configured to execute a process, including:
     receiving a computer aided design (CAD) model of a part;
     dividing the CAD model into a first section and a second section;
     receiving a selection of a first set of print parameters for the first section based on a user's interaction with one or more first graphical elements and a second set or print parameters for the second section based on a user's interaction with one or more second graphical elements, wherein the first set of print parameters is different from the second set of print parameters;

slicing the first section and the second section into a plurality of layers, wherein the first section is sliced based on one or more print parameters of the first set of print parameters selected based on the user's interaction with the one or more first graphical elements; and generating a print program for depositing a flowable material onto a surface according to the first set of print parameters and the second set of print parameters to manufacture the part.

14. The additive manufacturing system of claim 13, wherein the computing device is operatively connected to a computer numeric controlled (CNC) machine and is configured to control the CNC machine to manufacture the part based on the generated print program.

15. The additive manufacturing system of claim 14, wherein the first set of print parameters includes an upper Z material limit and a lower Z material limit, the lower Z material limit corresponding to a height above a worktable of the CNC machine.

16. The additive manufacturing system of claim 13, wherein a number of the plurality of layers is determined based on a height of one or more of the plurality of sections.

17. The additive manufacturing system of claim 13, further including a display and an input device, wherein the selection is received via the input device based on one or more graphical elements presented on the display by the processor.

18. The additive manufacturing system of claim 13, wherein the print program, when executed by an additive manufacturing apparatus, causes the additive manufacturing apparatus to form the first section with a lower most layer positioned at a height above the surface.

19. The additive manufacturing system of claim 13, wherein the set of print parameters includes one or more of: an accuracy with which a toolpath follows a corresponding contour of the part, a boundary thickness, a height limit, a slice plane, a layer spacing, a number of layers printed on a top layer of the part, a gear pump speed reduction, a void detection, a corner pull-back, an amount of adjacent bead overlap, a wall width, a material feed rate, a priming process, a coast process, a bead height, or a bead width.

20. The additive manufacturing system of claim 13, wherein the set of print parameters further includes one or more of: a layer spacing that defines a thickness of each layer to be produced by the slicing, a fill for any voids detected during an analysis of the part, a pull-back for removing excess material, a parameter for reversing direction on alternating layers, or a flow reversal for rotating an extruder screw or a gear pump in a reverse direction.

* * * * *